United States Patent
Watanabe et al.

[19]

[11] Patent Number: 6,157,947
[45] Date of Patent: Dec. 5, 2000

[54] METHOD, APPARATUS, SYSTEM, AND PROGRAM STORAGE DEVICE FOR DISTRIBUTING INTELLECTUAL PROPERTY

[75] Inventors: Yoshiaki Watanabe; Shigeyo Iino; Yasuaki Morita; Kazuhiro Nishimori; Ichiro Kijima, all of Kawasaki, Japan

[73] Assignee: Fujitsu Limited, Kawasaki, Japan

[21] Appl. No.: 09/245,919

[22] Filed: Feb. 8, 1999

[30] Foreign Application Priority Data

Feb. 9, 1998 [JP] Japan .................................. 10-027456

[51] Int. Cl.[7] ...................................................... G06F 13/00
[52] U.S. Cl. ............................................ 709/217; 709/203
[58] Field of Search .................................. 709/200, 201, 709/203, 217, 218, 219

[56] References Cited

U.S. PATENT DOCUMENTS

| | | | |
|---|---|---|---|
| 5,027,398 | 6/1991 | Miyoshi | 714/54 |
| 5,499,297 | 3/1996 | Boebert | 713/159 |
| 5,801,958 | 9/1998 | Dangelo et al. | 716/18 |
| 5,933,498 | 8/1999 | Schneck et al. | 705/54 |
| 5,963,454 | 10/1999 | Dockser et al. | 716/18 |
| 5,999,907 | 12/1999 | Donner | 705/1 |

FOREIGN PATENT DOCUMENTS

| | | |
|---|---|---|
| 9-69112 | 3/1997 | Japan . |
| 10-134074 | 5/1998 | Japan . |
| 97/22074 | 6/1997 | WIPO . |
| 97/46950 | 12/1997 | WIPO . |

OTHER PUBLICATIONS

A. Marken, "Data Structures for Enterprise Information", International Journal of Micrographics and Optical Technology, vol. 15, No. 2, pp. 2–3, 1997, see especially Inspect abstract accession No. 5612799.

A. Marken, "Data Structures for Enterprise Information", International Journal of Micrographics and Optical Technology, vol. 15, No. 2, pp. 2–3, 1997.

*Primary Examiner*—Moustafa M. Meky
*Attorney, Agent, or Firm*—Staas & Halsey LLP

[57] ABSTRACT

A distribution apparatus is used to distribute intellectual property to be reused for semiconductor product designing. The distribution apparatus has a memory portion for registering intellectual property, users, and services available for the users, a processing portion for providing a user with a service allowed for the user, and a communication portion for automatically distributing the intellectual property. The distribution apparatus enables users to receive information about the intellectual property on time and to optimally share the intellectual property.

46 Claims, 28 Drawing Sheets

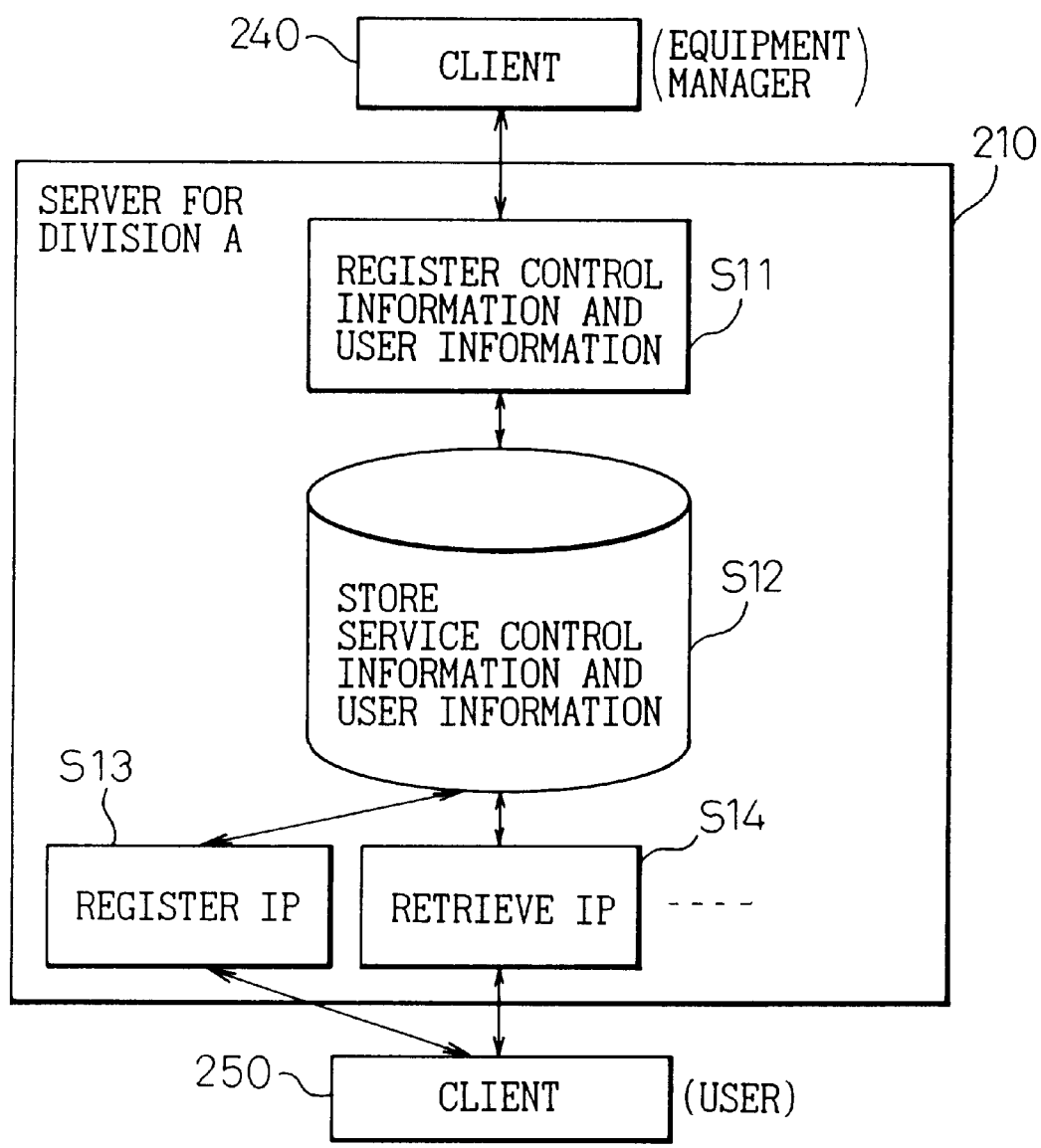

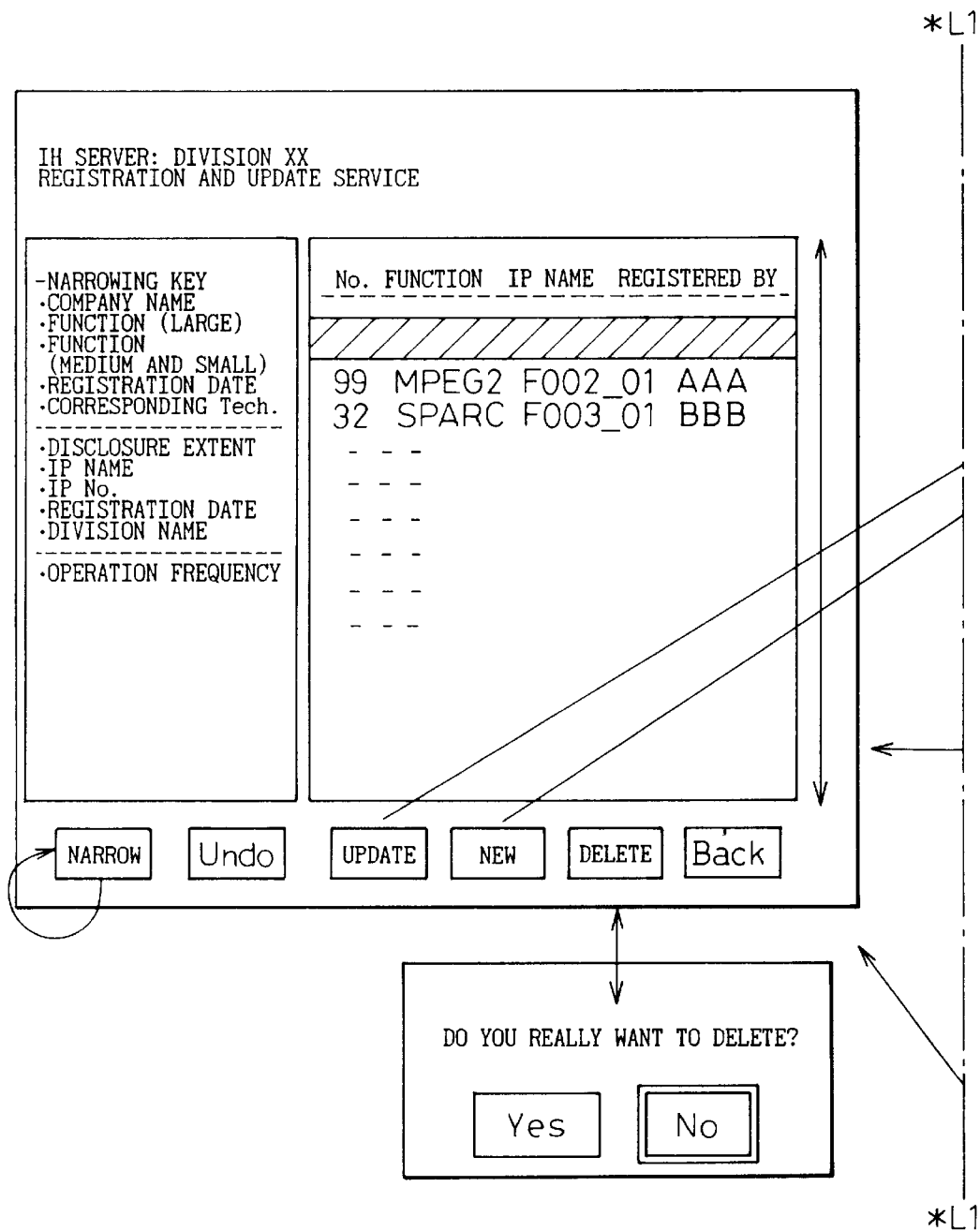

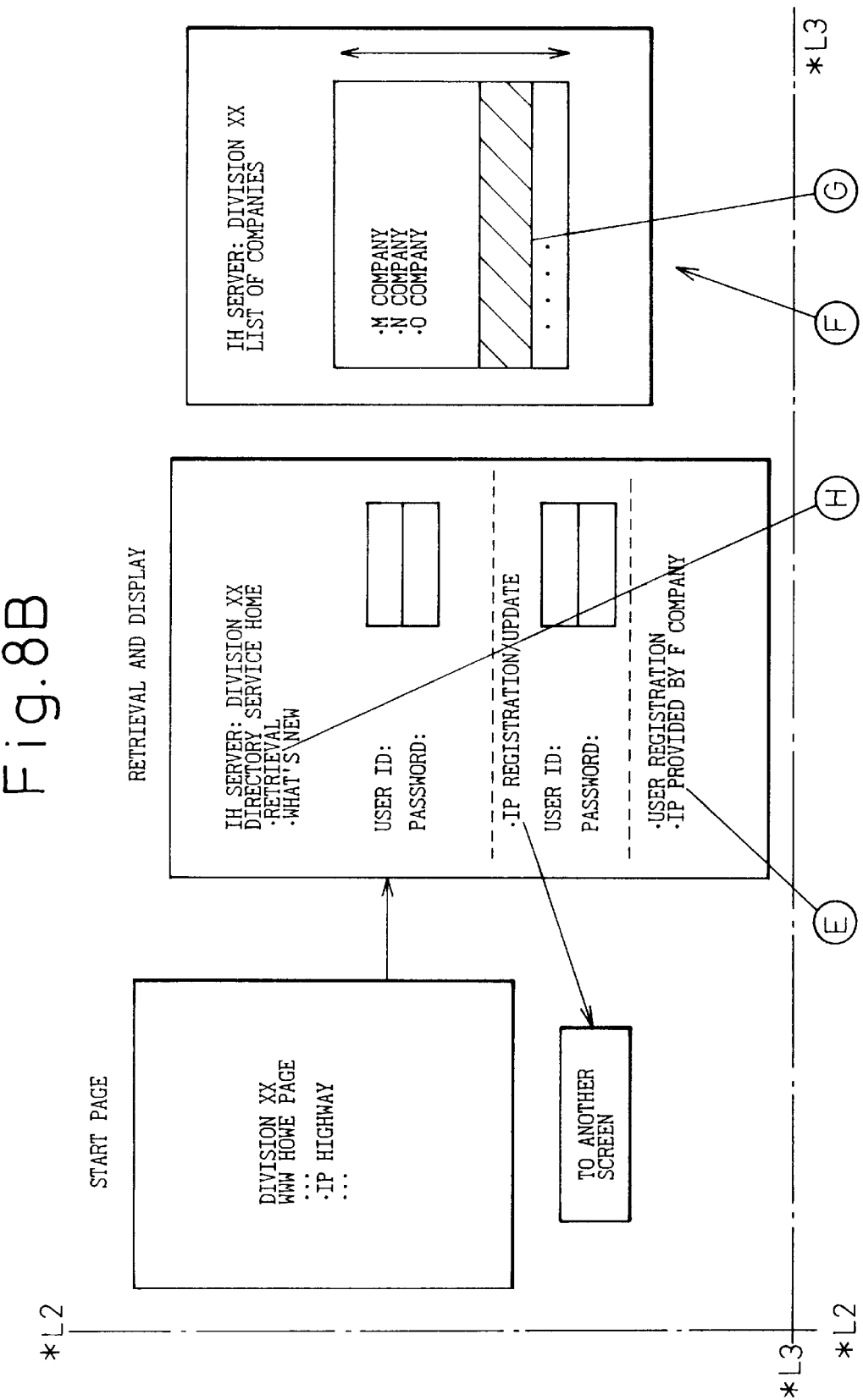

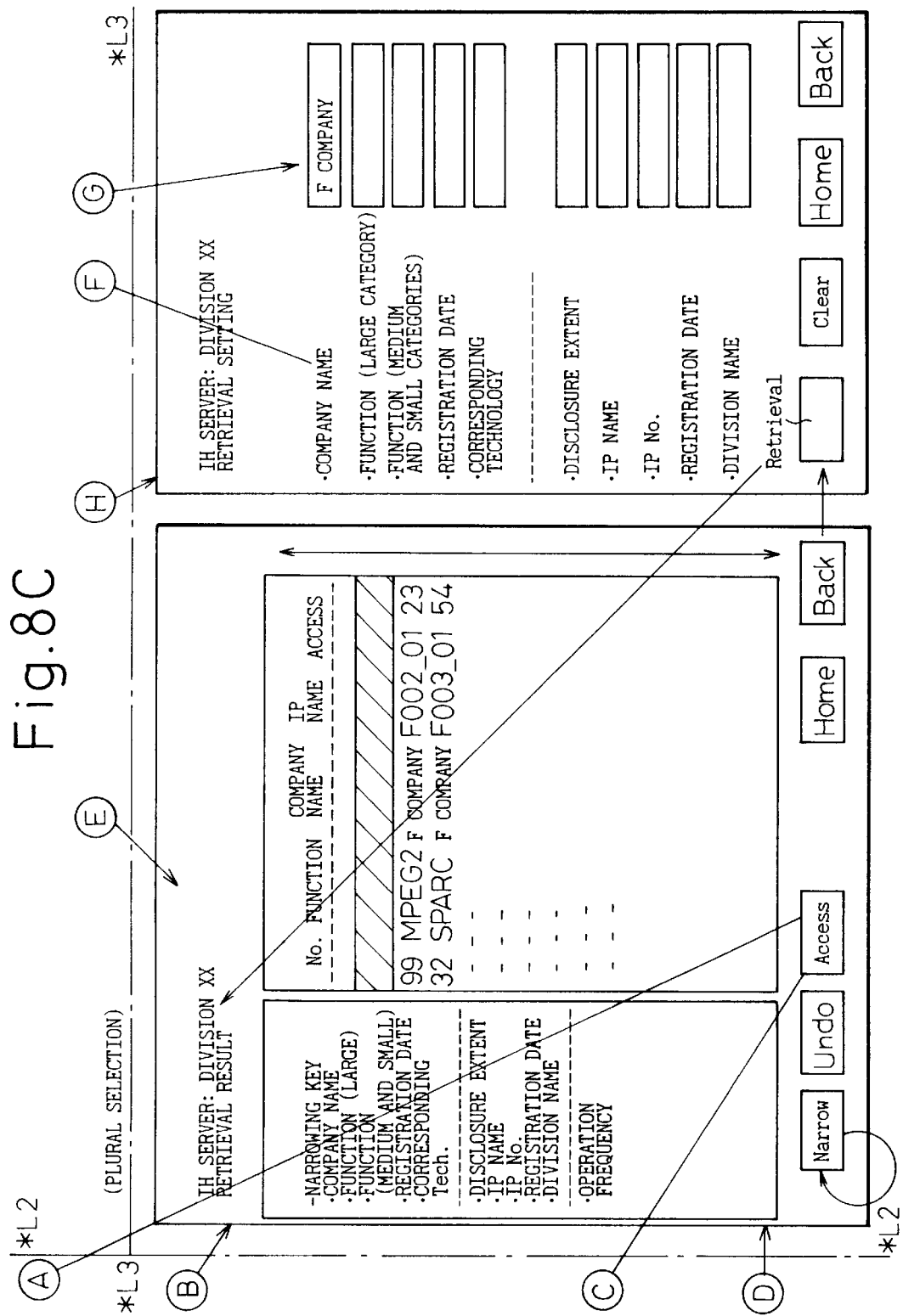

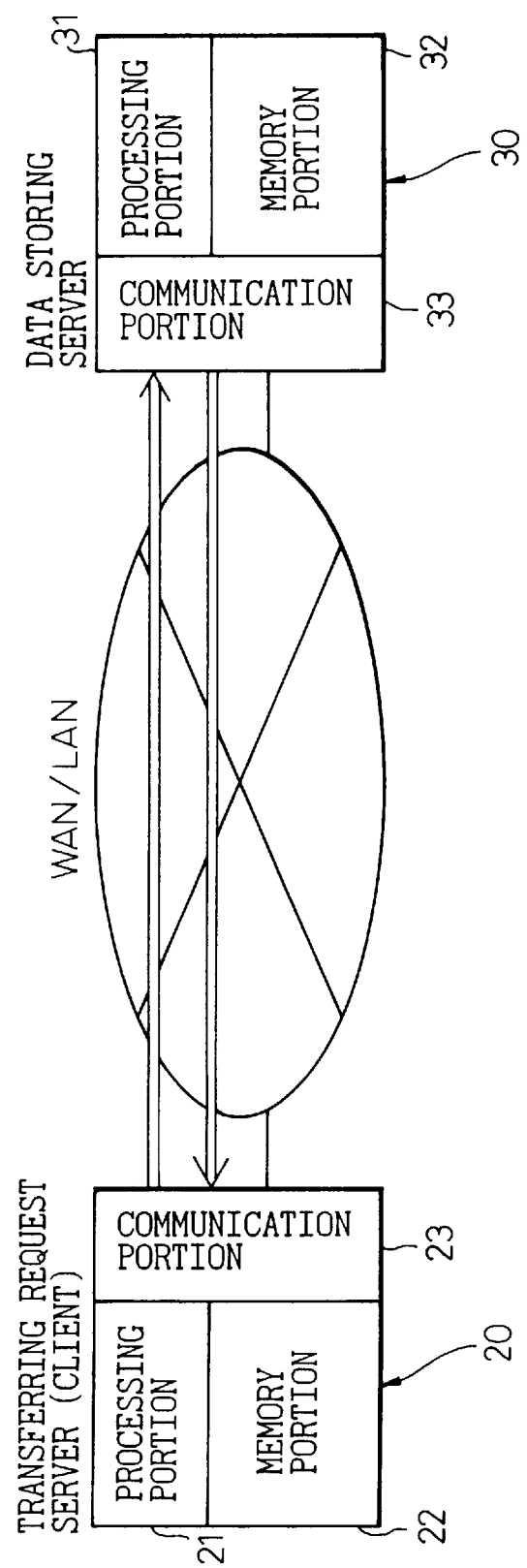

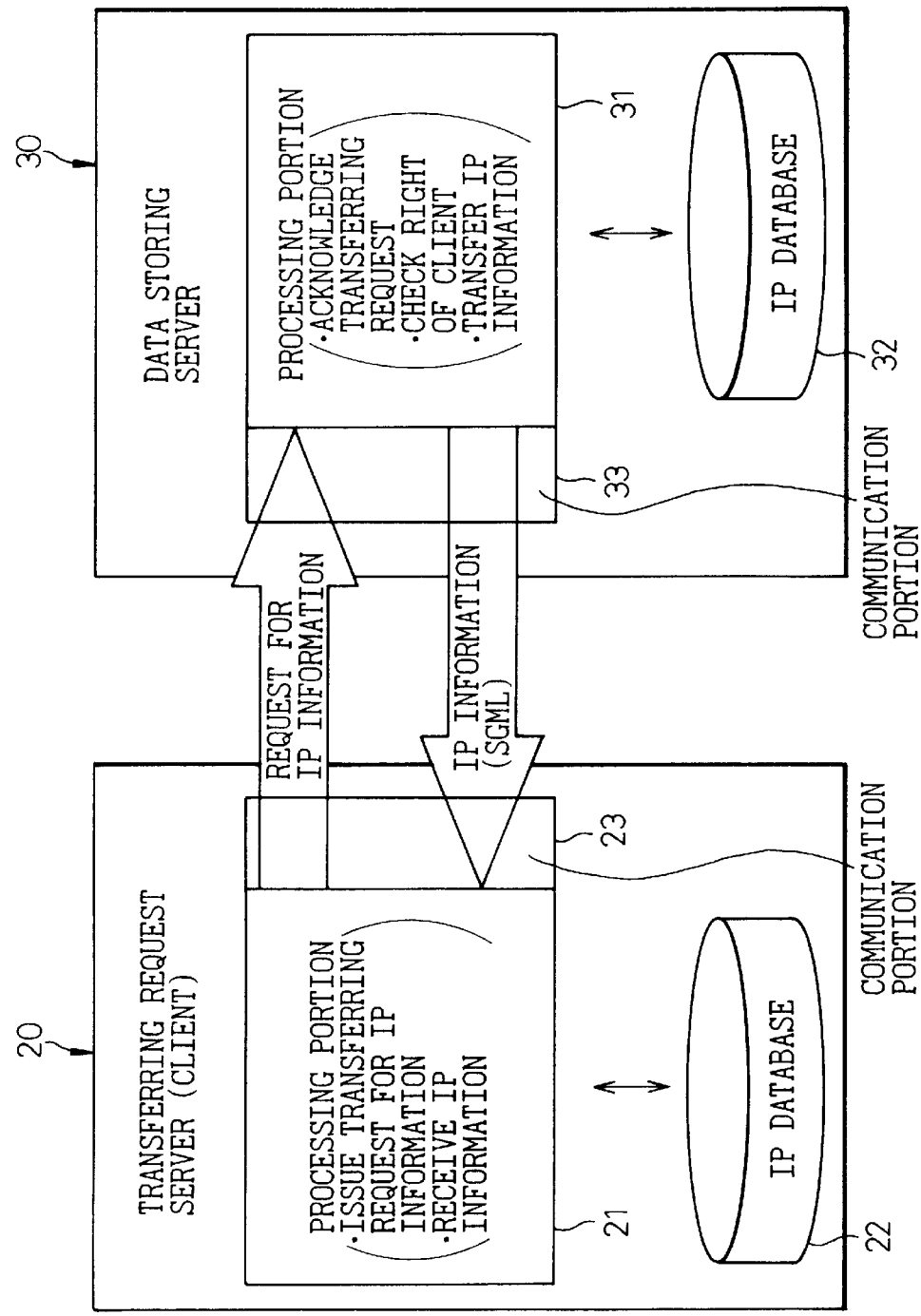

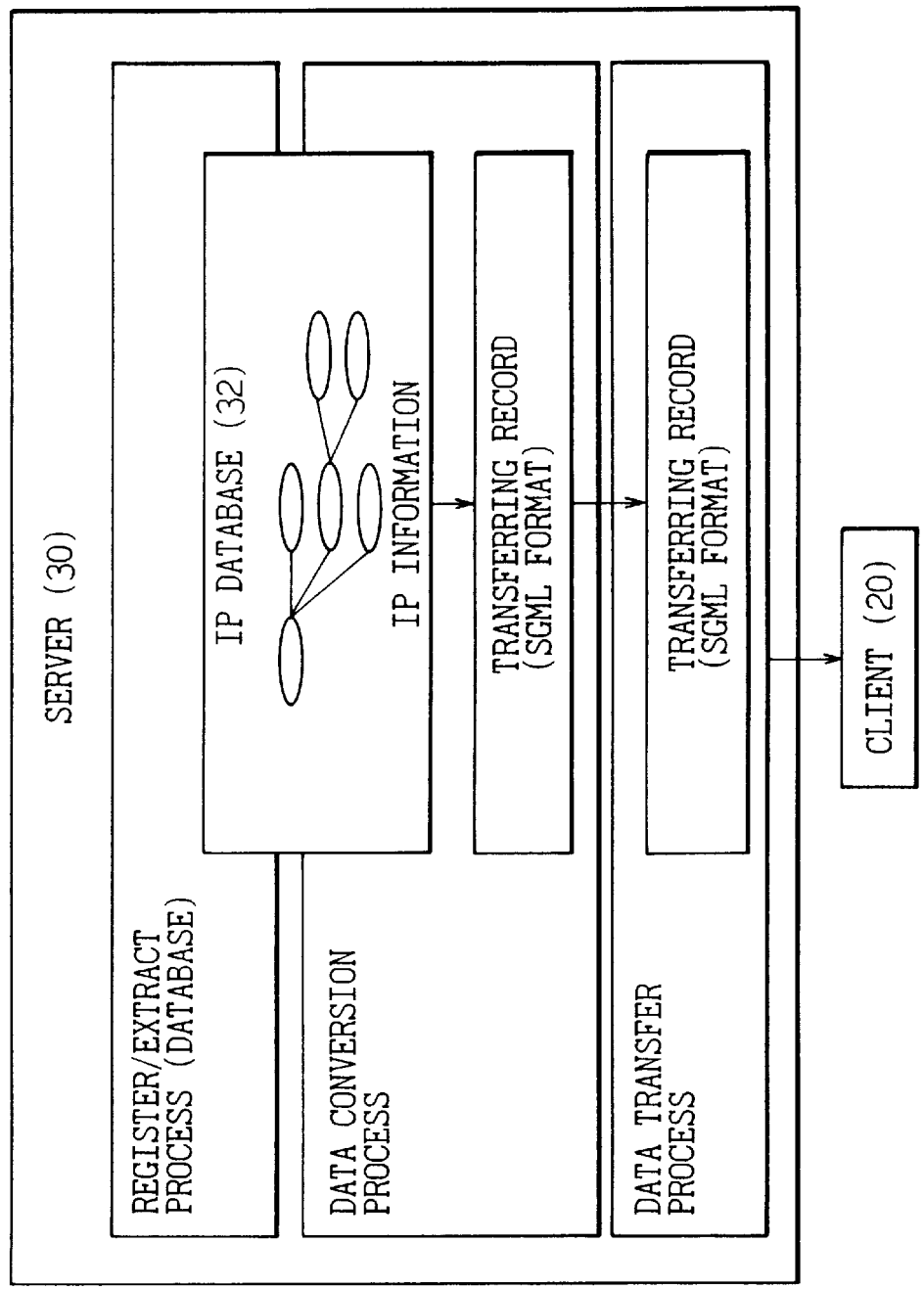

Fig.16

| COMPANY NAME | A COMPANY | B COMPANY | C COMPANY |
|---|---|---|---|
| IP NAME | AIC-xxx | MDxxx | MBxxx |
| FUNCTION | IEEE1394 | IEEE1394 | IEEE1394 |
| TRANSFER RATE | 400M | 200M | 200M |
| | Logic Design | Logic Design | Logic Design |
| REFERENCE | aa-aaa-aa-aaa | bb-bbb-bb-bbb | ccc-ccc-cccc |
| URL | www.A.com | www.B.com | www.c.co.jp |

DISTRIBUTION LEVEL (DISCLOSURE) (EXTENT)

[Sort] [Cancel] [Detail]

METHOD, APPARATUS, SYSTEM, AND PROGRAM STORAGE DEVICE FOR DISTRIBUTING INTELLECTUAL PROPERTY

BACKGROUND OF THE INVENTION

1. Field of the Invention

The present invention relates to a method, apparatus, system, and program storage device for distributing intellectual property, in particular, to a system for distributing semiconductor design property (design information) through the Internet and intranets.

2. Description of the Related Art

Recent improvements in the integration of semiconductor devices are raising problems of increasing the number of LSI manufacturing processes and prolonging the LSI development period. To solve the problems, it is important to reuse intellectual property (IP), in particular, semiconductor design property related to cores (megacells), circuit libraries, and software parts for microprocessors and for built-in units. To reuse the intellectual property, a system is needed for promoting the distribution thereof. In view of advancing network technology, what is needed is a system that uses the Internet and intranets to distribute intellectual property.

Namely, to obtain intellectual property, one may get a printed catalog first, an explanation about detailed specifications second, and then circuit data stored in an electronic medium such as a floppy disk. Therefore, many steps and a long time are needed to get intellectual property. This hinders the reuse of intellectual property and the development of system LSIs.

Prior art and the problems thereof will be explained later in connection with drawings.

SUMMARY OF THE INVENTION

An object of the present invention is to provide a distribution technique (method, apparatus, system, and program storage device) for distributing intellectual property, in particular, semiconductor design property, so that users can easily re-use it. Another object of the present invention is to provide a distribution technique that realizes the maximum use of shared intellectual property.

According to the present invention, there is provided a distribution apparatus for distributing intellectual property to be reused for semiconductor product designing, comprising a memory portion for registering intellectual property, users, and services available for the users; a processing portion, connected to the memory portion, for providing a user with a service allowed for the user; and a communication portion, connected to the processing portion, for automatically distributing the intellectual property.

The memory portion may register control information about the services, retrieval information about the intellectual property, and extraction information about the intellectual property. The intellectual property may include a catalog used when retrieving the intellectual property, contents effectively representing the intellectual property, and circuit data to be reused for designing a semiconductor product; and the registered intellectual property may be processed according to the services so that the users can use the intellectual property.

The catalog may be processed and stored in the memory portion, and when a plurality of intellectual properties are obtained as a retrieval result, these intellectual properties may be displayed by comparing items therebetween. The items may be determined by the user. The catalog may be registered collectively or through a menu according to category information, and the intellectual property may be processed according to the category information. The circuit data may be prepared for each development stage of semiconductor products so that a proper piece of circuit data may be reused for a given development stage. The circuit data may be registered according to registration rules that are set in advance.

The users may be divided into groups that are related to disclosure extents; and each piece of intellectual property may be registered with a disclosure extent so that each piece of the intellectual property may be disclosed to the users according to the disclosure extent. A catalog of a given piece of intellectual property may be registered with a mask that defines a disclosure extent of the catalog.

The memory portion may register category information for intellectual property so that the intellectual property may be distributed among different environments according to the category information. A retrieval operation on the catalog may be carried out by narrowing hierarchical categories related to the catalog and by specifying key words and at least one category item.

A mailing state may be registered at a specific occasion for each user to indicate whether or not information about the registration of intellectual property must be passed to the user; and mail may be sent to the user, according to the mailing state, on a specific occasion. Each piece of intellectual property may be registered with a display condition on a specific occasion so that the intellectual property may be processed and displayed according to the display condition. The specific occasion may be at the time of registering, updating and deleting the intellectual property, and the time of changing disclosure extents. A log of users who accessed the intellectual property may be collected; and the log may be processed and displayed according to users and may be automatically linked with groupware so that the processed log may be provided to the users.

According to the present invention, there is also provided a distribution apparatus for distributing intellectual property, to be reused for semiconductor product designing, comprising a registration means for registering intellectual property, users, and services available for the users; an execution means for providing a user with a service allowed for the user; and a distribution means for automatically distributing the intellectual property.

Further, according to the present invention, there is provided a distribution system having at least one server for distributing intellectual property to be reused for semiconductor product designing, wherein the server comprises a memory portion for registering intellectual property, users, and services available for the users; a processing portion, connected to the memory portion, for providing a user with a service allowed for the user; and a communication portion, connected to the processing portion, for automatically distributing the intellectual property.

The distribution system may comprise a plurality of servers that are hierarchically managed; and information about the servers may be registered with hierarchical information and disclosure extents so that intellectual property may be transferred among the servers according to the hierarchical information and disclosure extents. The information about the servers may be registered with disclosure approval conditions so that a given server may disclose only approved intellectual property pieces. The servers may be connected to one another through networks.

Further, according to the present invention, there is also provided a distribution method for distributing intellectual property to be reused for semiconductor product designing, comprising the steps of registering intellectual property, users, and services available to the users; providing a user with a service allowed for the user; and automatically distributing the intellectual property.

In addition, according to the present invention, there is provided a program storage device readable by a machine, tangibly embodying a program of instructions executable by the machine to perform a distribution method of distributing intellectual property to be reused for semiconductor product designing, the method comprising the steps of registering intellectual property, users, and services available for the users; providing a user with a service allowed for the user; and automatically distributing the intellectual property.

BRIEF DESCRIPTION OF THE DRAWINGS

The present invention will be more clearly understood from the description of the preferred embodiments as set forth below with reference to the accompanying drawings, wherein:

FIG. 6 is a diagram for explaining an example of processes carried out in the system of the present invention;

FIGS. 7A and 7B are diagrams schematically showing an example of a display screen used when carrying out registration, update, and deletion processes in the system of the present invention;

FIGS. 8A, 8B, and 8C are diagrams schematically showing an example of a display screen used when carrying out a retrieval process in the system of the present invention;

FIG. 9 is a block diagram schematically showing two servers in the system of the present invention;

FIG. 10 is a diagram for explaining operations of the two servers shown in FIG. 9;

FIG. 11 is a diagram for explaining an example of a SGML data processing in the system of the present invention;

FIG. 16 is a diagram schematically showing an example of a display screen used when carrying out a comparison displaying process in the system of the present invention;

DESCRIPTION OF THE PREFERRED EMBODIMENTS

For a better understanding of the preferred embodiments of the present invention, a prior art and the problems thereof will be explained.

Improvements in semiconductor technology are drastically increasing the circuit scale of semiconductor products. For example, system LSIs with 20 million transistors employing 0.25-$\mu$m design rules are being mass-produced.

There are system ASICs (application specific integrated circuits) having a general-purpose microprocessor or an ASSP (application specific standard product), peripheral logic circuits, memories, a communication protocol processor, and an I/O bus interface integrated into a single chip. System LSIs mentioned in this specification cover system ASICs, MPUs, and ASSPs.

The system LSIs are provided with circuit blocks containing a core, memories, and peripheral circuits according to required functions. The increased integration and complicated functions raise a problem in the system LSIs of increasing the number of processes and the duration of development. To solve the problem, the distribution of ASSPs is changing from individual chip distribution to intellectual property distribution.

Figure 1:
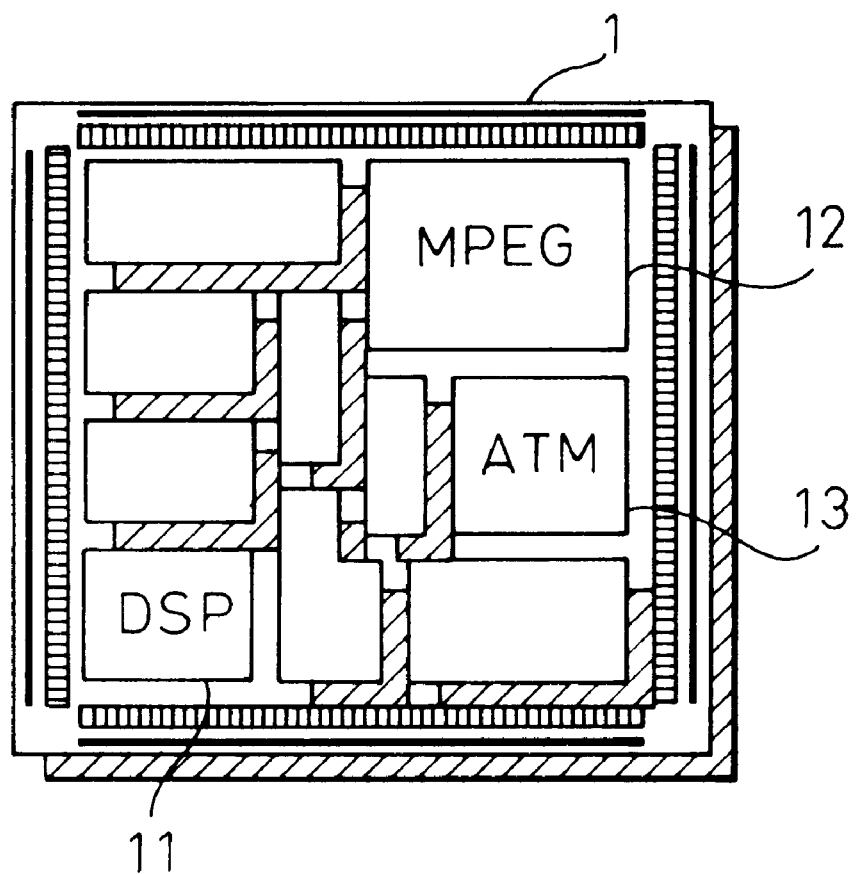
FIG. 1 is a diagram schematically showing an example of a system LSI.

FIG. 1 shows a multimedia LSI, which is one of the system LSIs.

The LSI 1 comprises a DSP (digital signal processor) block 11, an MPEG (Motion Picture Expert Group) block 12, and an ATM (asynchronous transfer mode) block 13. These blocks 11, 12, and 13 are provided in the form of intellectual property.

To obtain intellectual property, one may get a printed catalog first, an explanation about detailed specifications second, and then circuit data stored in an electronic medium such as a floppy disk.

Many steps and a long time are needed to get intellectual property. This hinders the reuse of intellectual property and the development of system LSIs.

To solve the problems, an apparatus and system for distributing intellectual property, in particular, semiconductor design property according to an embodiment of the present invention will be explained.

Figure 2:
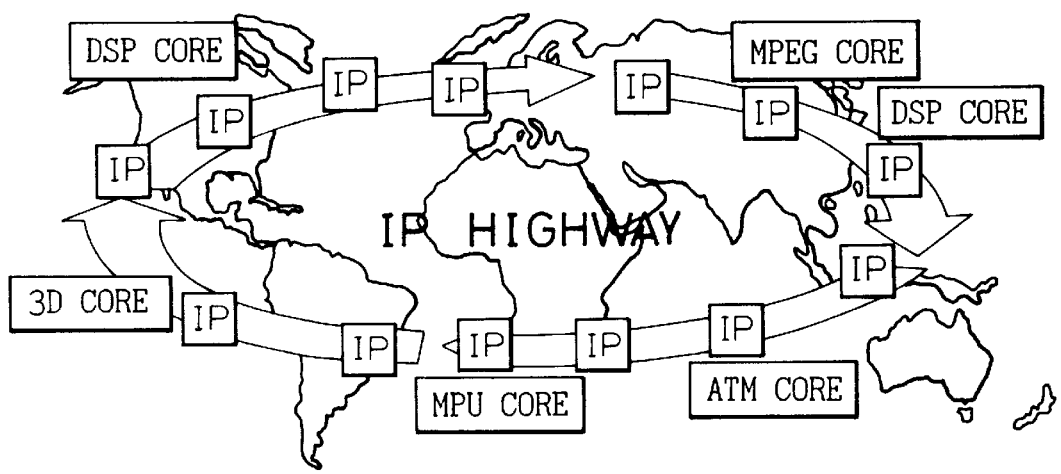
FIG. 2 is a diagram conceptionally showing a system for distributing intellectual property according to the present invention.

FIG. 2 conceptionally shows a system for distributing intellectual property according to the present invention.

As shown in FIG. 2, according to the present invention, intellectual property (IP) information for a DSP core (block), MPEG core, ATM core, and the like can be distributed around the world by using the internet and intranets. Namely, the distribution system (IP Highway system) of the present invention can automatically distribute IP information on a server in one office to servers in other offices using open server communication technologies.

Figure 3:
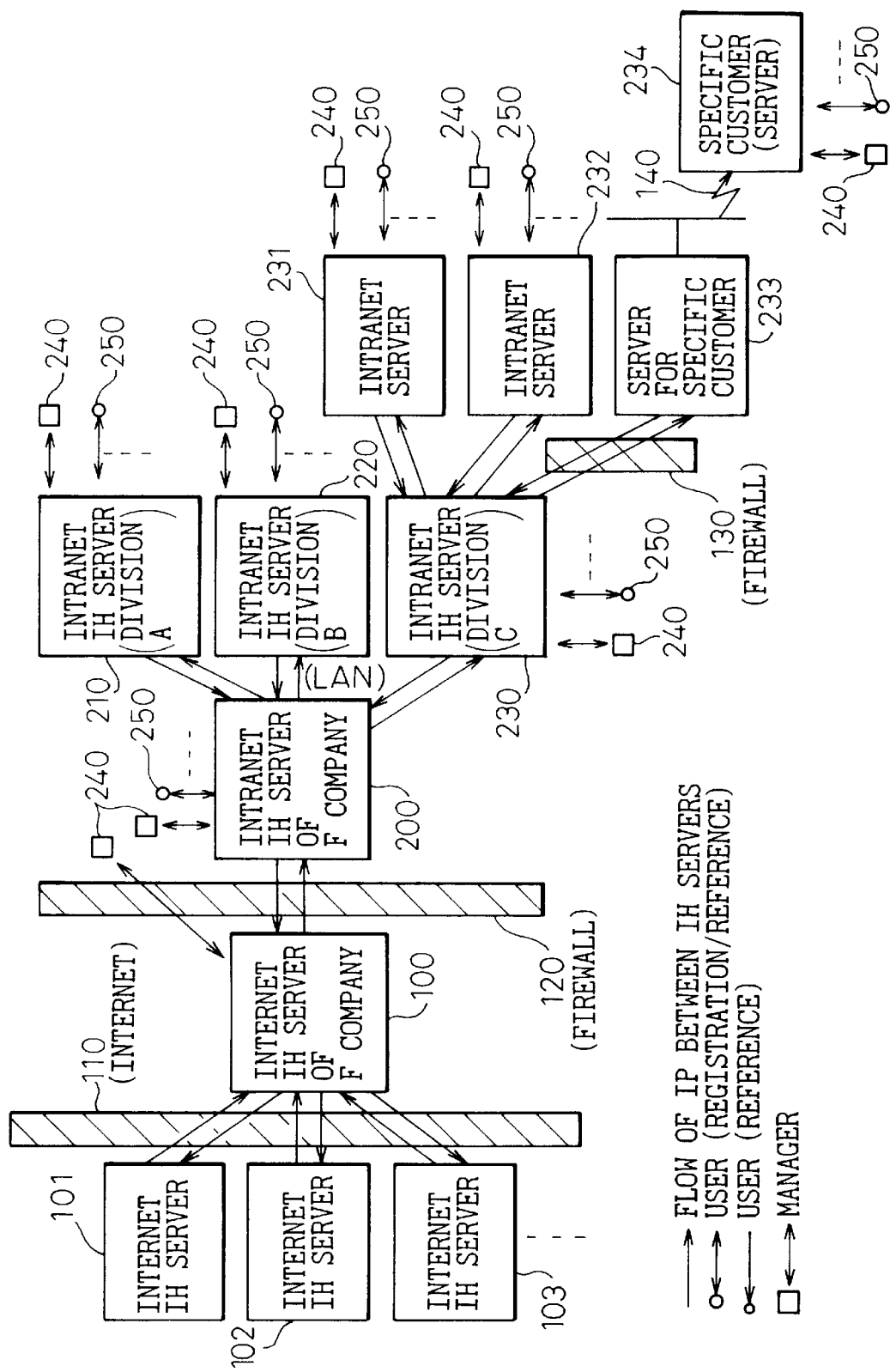
FIG. 3 is a block diagram schematically showing an example of a system for distributing intellectual property according to the present invention.

FIG. 3 is a general view showing an example of the intellectual property distribution system of the present invention applied to, as an example, F company. The system includes an internet IH ("IH" represents "intellectual property highway") server 100 of the F company, internet IH servers 101, 102, 103, and the like of other companies connected to the server 100 through the Internet 110, firewalls 120 and 130, an intranet IH server 200 of the F company, intranet IH servers 210, 220, and 230 provided for divisions of the F company, intranet servers 231 and 232 provided for project teams of the F company, a server 233 for a specific customer, a private line 140, the specific customer 234, a manager 240, and a user 250.

The IH servers are capable of transmitting pieces of intellectual property at high speed. In this embodiment, the intellectual property is semiconductor design property related to cores (megacells), circuit libraries, and software parts for microprocessors for built-in devices. Each piece of intellectual property includes a catalog, contents, a stamp, and design data. The catalog shows the provider, functions, specifications, and business conditions of the intellectual property. The contents include data sheets, bug and update information, and questions and answers related to the intellectual property. The stamp indicates the registration date, disclosure extent, and the number of references to the intellectual property. The design data is expressed in Verilog-HDL (hardware description language), VHDL (VHSIC hardware description language), or GDSII.

The distribution system connects the IH servers to one another through the Internet 110 to share intellectual property for system LSIs in real time. The server 100 is provided for each company or each office to collect information about intellectual property and disclose its own intellectual property worldwide.

The server 200 serves as a parent intranet server of the F company, to collect information about intellectual property through the F company and provide users in the F company with the collected information so that the users may efficiently utilize intellectual property worldwide. The server 200 transfers intellectual property among the child servers 210, 220, and the like.

The child servers 210, 220, and the like are provided for divisions of the F company, respectively, to transfer intellectual property among them. Any child server (230 in FIG. 3) may have grandchild intranet servers 231 and 232, which are connected to project teams of the F company, respectively. The child server 230 is connected to the specific customer server 233 through the firewall 130. The server 233 may be connected to a server of the specific customer 234 through the private line 140. The distribution system of the present invention is achievable in various ways. The child intranet servers, grandchild intranet servers, specific customer servers, etc., are not always necessary for the system of the present invention.

Figure 4:
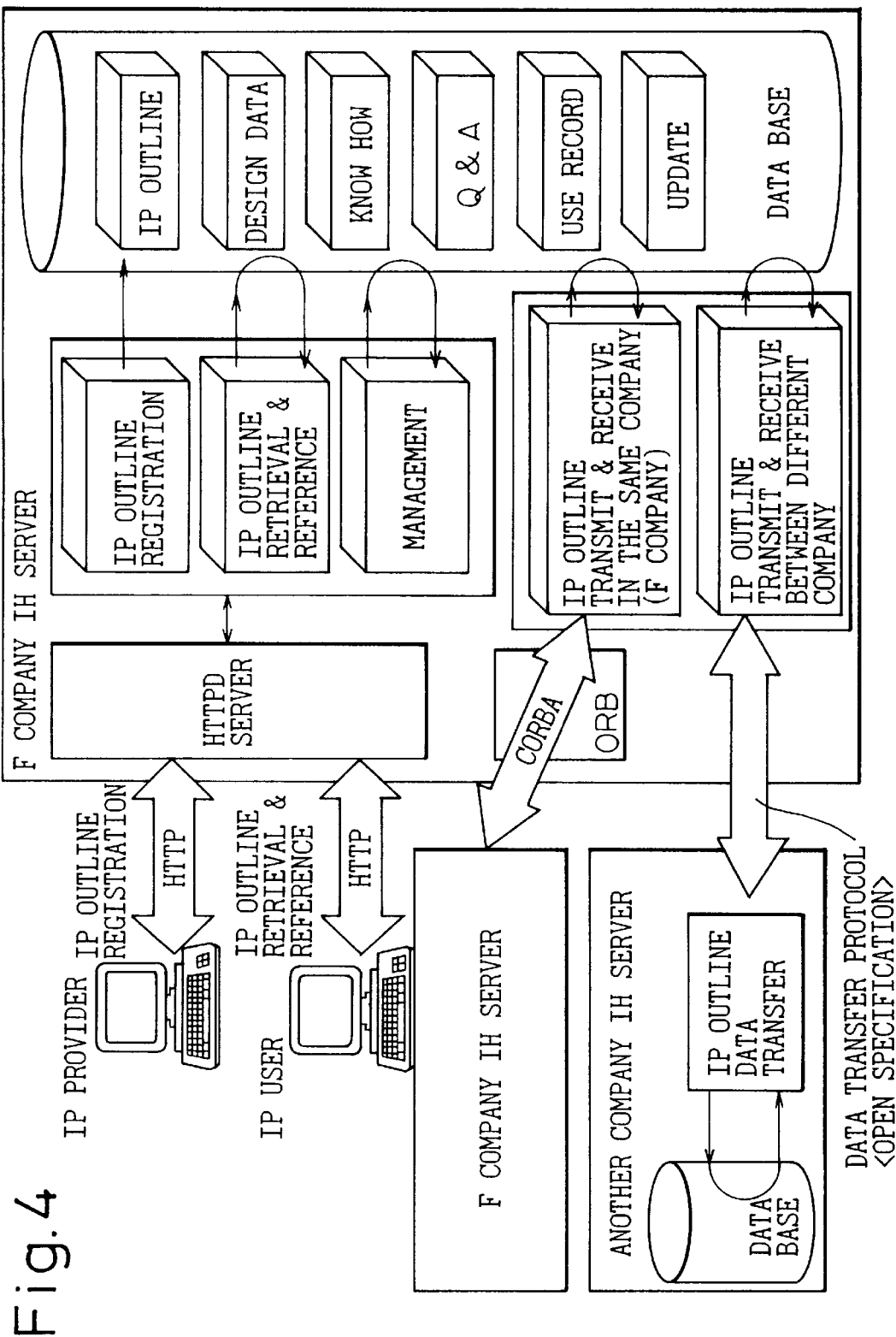
FIG. 4 is a block diagram schematically showing an example of a system configuration according to the present invention.

FIG. 4 schematically shows an example of a system configuration according to the present invention.

As shown in FIG. 4, a plurality of IH servers, IP users, and IP providers are included in the distribution system. The IP users and IP providers are connected by using a http (Hyper-Text Transfer Protocol) through a httpd server in the F company IH server. Note that the IP user registers IP outlines into a database of the F company IH server by using the http, and the IP user retrieves and refers the IP outlines stored in the data base by using the http. In the database of the F company IH server, design data, know how, Q & A (questions and answers), use records, and update data are also stored.

In FIG. 4, CORBA (Common Object Request Broker Architecture) is used between servers. Namely, LSI designers (IP users) can retrieve IP information on-demand using the system's high-performance search technologies. Further, standard technologies, which are easy for many companies to use, are employed for the server communication. For example, a SGML (Standard Generalized Markup Language) format is used for communication records, and the CORBA method is used for server communication. In addition, search engines employ a classification method for IP items and a comparison method for IP information, that are searched.

Figure 5:
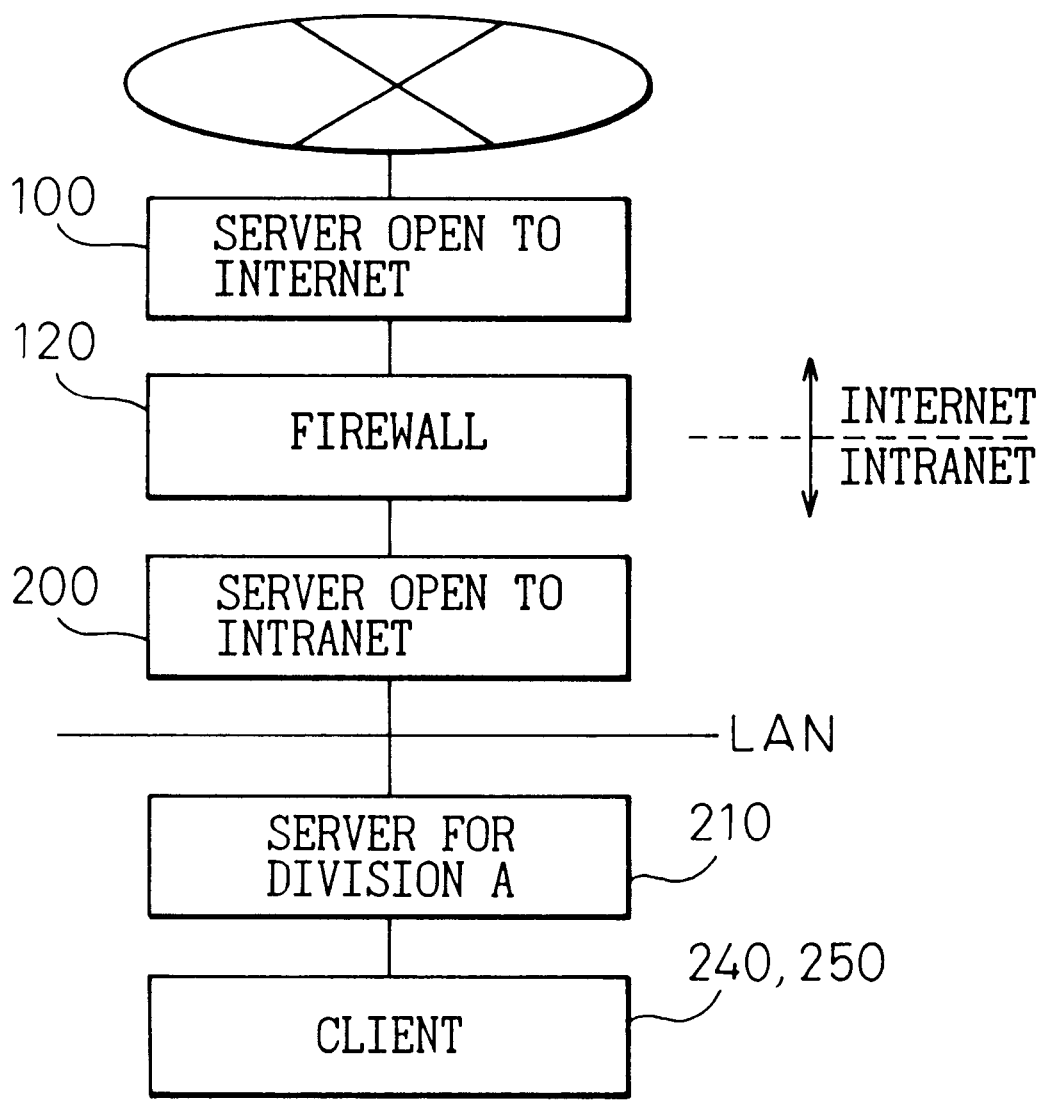
FIG. 5 is a block diagram showing an essential part of the system (system for distributing intellectual property) of the present invention.

FIG. 5 shows an essential part of the distribution system according to the present invention, and FIG. 6 shows processes carried out in the server 210 of the division A of the F company. The server 210 is connected to the server 200 through a LAN (local area network).

A server-client process will be explained with reference to FIG. 6.

In step S11, the manager 240 registers control information and user information in the server 210. Namely, the manager 240 registers server control data such as a server name, the necessity of approval when disclosing data, data transfer timing, data retention period, a manager name, a group name, user names, and services provided. In steps S12, S13, and S14, a user 250 refers to the registered data when registering and retrieving a piece of intellectual property from and through the server 210.

If approved, the user 250 may change a password and the disclosure extent of an intellectual property piece stored in the server 210. The user 250 may register, update, delete, retrieve, refer to, and extract an intellectual property piece from and through the server 210.

Figure 7B:
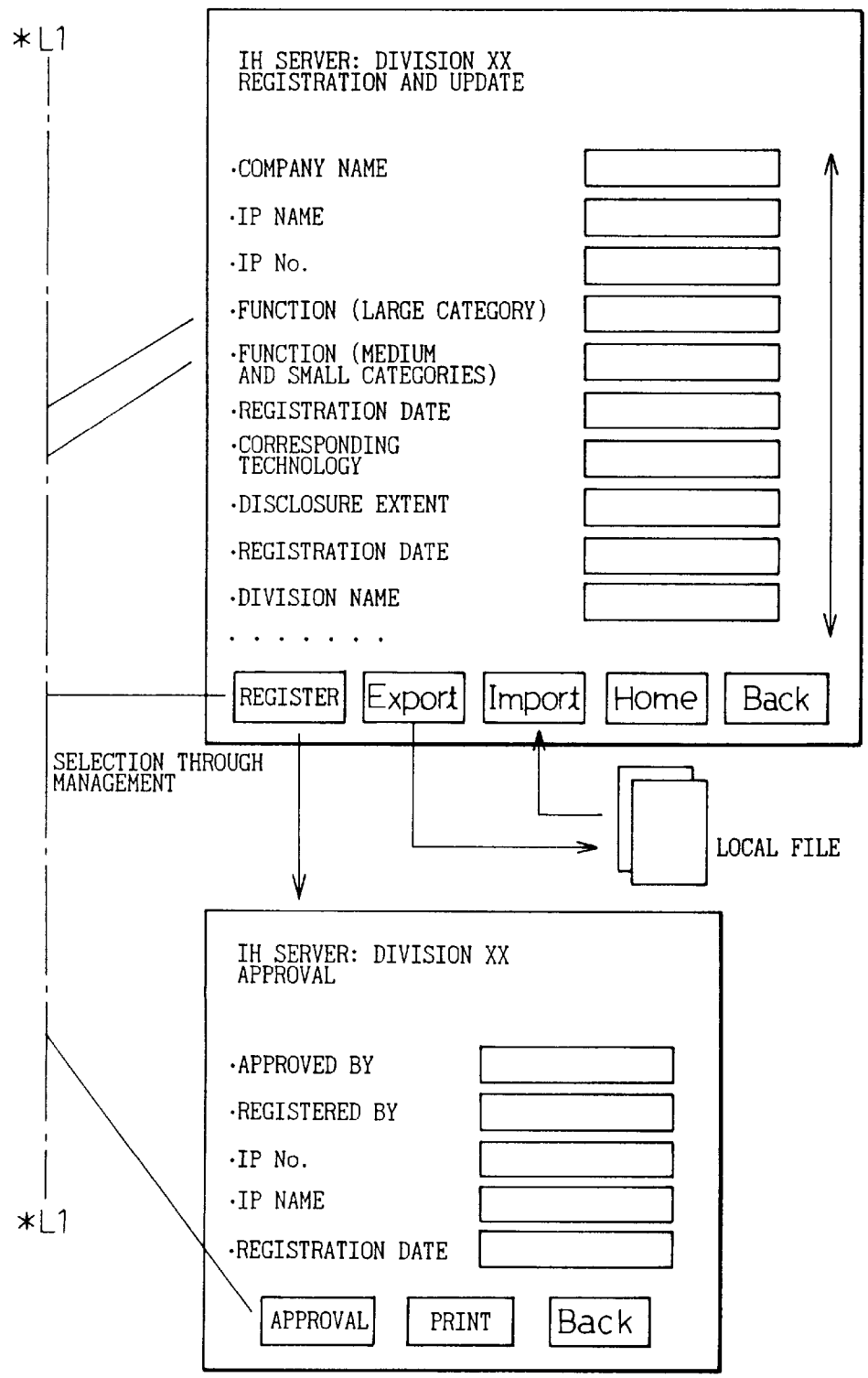

FIGS. 7A and 7B show an example of a display screen used when registering, updating, and deleting an intellectual property piece and changing the disclosure extent of an intellectual property piece in the system of the present invention.

Figure 8A:
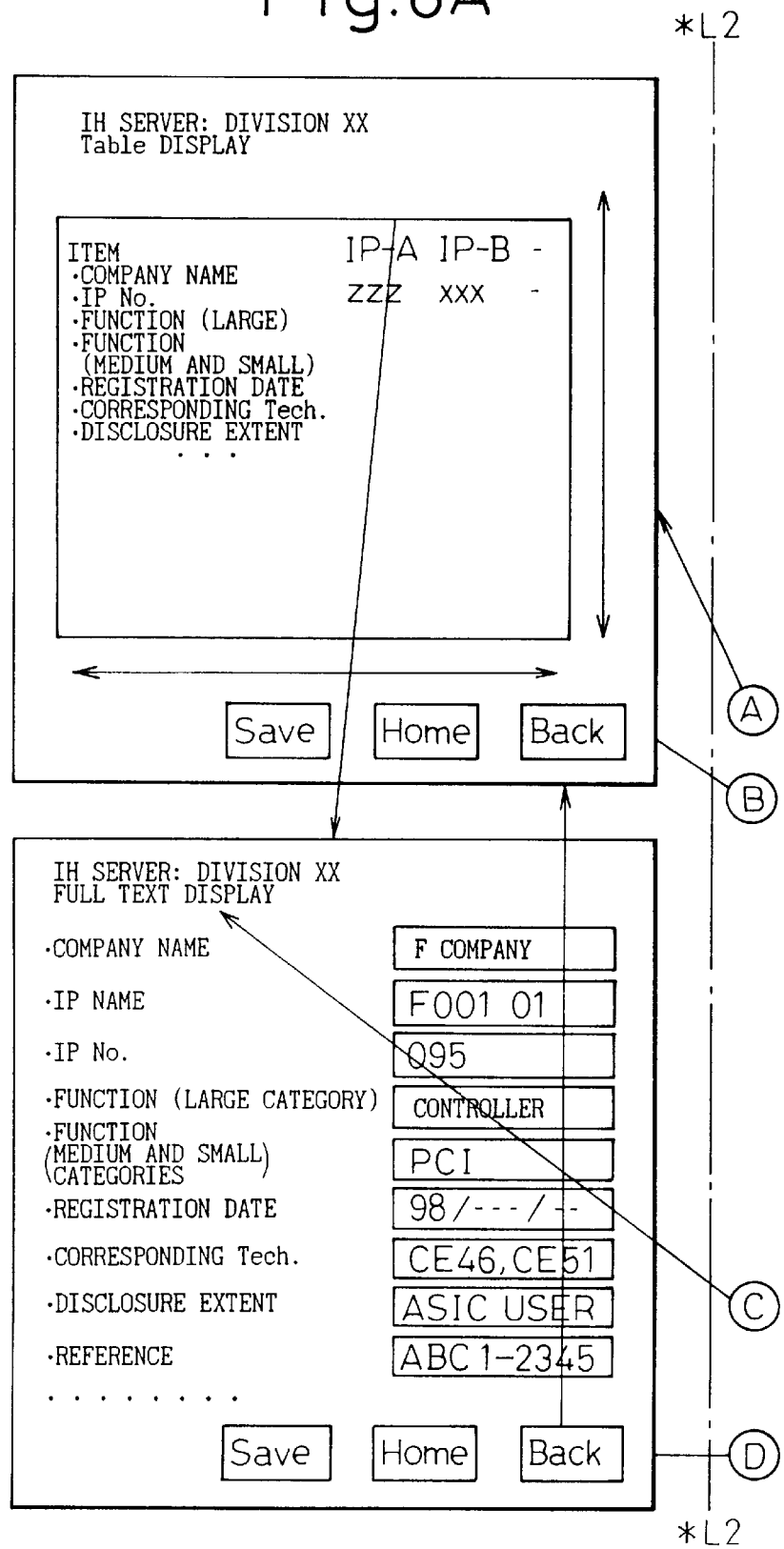

FIGS. 8A, 8B, and 8C show an example of a display screen used when retrieving, registering, updating, and deleting intellectual property and changing the disclosure extent of intellectual property.

The examples of FIGS. 7A to 8C handle intellectual property related to MPEG2 and SPARC (registered trade mark).

FIG. 9 schematically shows two servers in the distribution system of the present invention, and FIG. 10 is a diagram for explaining operations of the two servers shown in FIG. 9. In FIGS. 9 and 10, only two servers 20 and 30 are described in order to easily and simply explain the operations therebetween, however, a plurality of servers are included in the distribution system and connected by using the Internet and intranets in practice.

As shown in FIGS. 9 and 10, each server 20, 30 comprises a processing portion 21, 22, a memory portion 22, 32, and a communication portion 23, 33, respectively. The memory portion 22, 32 is used to register intellectual property, users, and services available for the users; the processing portion 21, 31, which is connected to the memory portion 22, 32, is used to provide a user with a service allowed for the user; and the communication portion 23, 33, which is connected to the processing portion, is used to automatically distribute the intellectual property.

In the following explanation, the server 20 is a transferring request server (client) requesting intellectual property (IP information), and the server 30 is a data storing server storing the IP information. Note that, in the distribution system, a data transferring process (transferring IP information) is started and carried out in accordance with a transferring request of the client (transferring request server 20). Further, for example, CORBA (Common Object Request Broker Architecture) is used for transferring data between servers in the intranets, and FTP (File Transfer Protocol) is used for transferring data between servers in the Internet, by considering security and efficiency of the data transferring process. CORBA is a standard communication architecture between distributed objects in the intranets, FTP is a standard file transferring protocol in the Internet, and CORBA and FTP are open server communication technologies.

As shown in FIG. 10, in the transferring request server 20, the processing portion 21 issues a transferring request for IP information and receives the IP information through the communication portion 23; and the IP information received by the processing portion 21 is stored in the memory portion (IP database) 22. The processing portion 21 corresponds to a central processing unit, application software for distributing IP information, and the like, and the memory portion 22 corresponds to a hard disk device, optical disk device, and the like.

On the other hand, in the data storing server 30, the processing portion 31 acknowledges the transferring request for IP information, checks the rights of the transferring request server (client) 20, and then, transfers the IP information, which is stored in the memory portion (IP database) 32, to the transferring request server 20 through the communication portion 33.

The IP information is transferred from the data storing server 30 to the transferring request server 20 in SGML (Standard Generalized Markup Language) format.

FIG. 11 is a diagram for explaining an example of SGML data processing in the system of the present invention.

As shown in FIGS. 10 and 11, the server (data storing server 30) transfers the IP information to the client (transferring request server 20) in SGML format. Namely, in a register/extract process of the data storing server 30, IP information is extracted from the IP database (32), and further, in a data conversion process of the data storing server 30, the IP information is converted to a transferring record format in SGML format. Further, in a data transfer process of the data storing server 30, the IP information converted to SGML format is transferred to the client (transferring request server 20) through the communication portion 33 of the data storing server 30.

Note that, in the above description, the transferring record format is specified in SGML format, but the transferring record format can be determined in HTML (Hyper Text Markup Language) document form (HTML format), XML (Extensible Markup Language) format, and the like.

Figure 12:
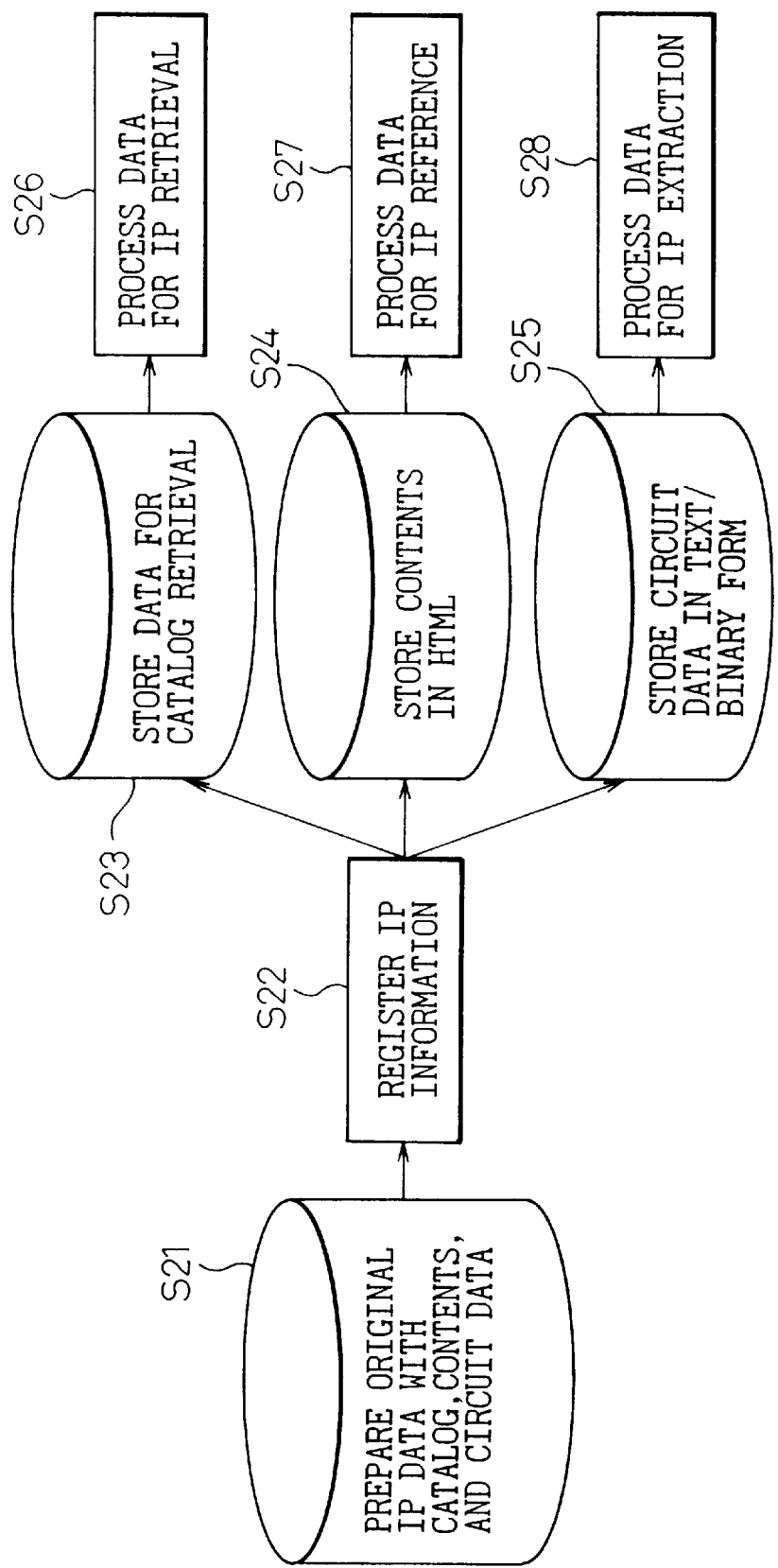
FIG. 12 is a diagram schematically showing a structure of intellectual property, in particular, semiconductor design property handled by the system of the present invention.

FIG. 12 shows the structure of intellectual property, in particular, semiconductor design property, handled by the system of the present invention.

Step S21 maintains original intellectual property. Each piece of the intellectual property consists of a catalog, contents, and circuit design data. Step S22 registers intellectual property information based on the intellectual property. Hereinafter, the intellectual property information is referred to as the IP information. Step S23 prepares catalog retrieval data from the IP information, and step S26 retrieves a necessary piece of intellectual property according to the catalog retrieval data. Step S24 prepares an HTML (Hyper Text Markup Language) document from the IP information, and step S27 refers the intellectual property according to the HTML document. Step S25 prepares circuit data from the IP information, and step S28 reuses the circuit data to develop LSIs.

Figure 13:
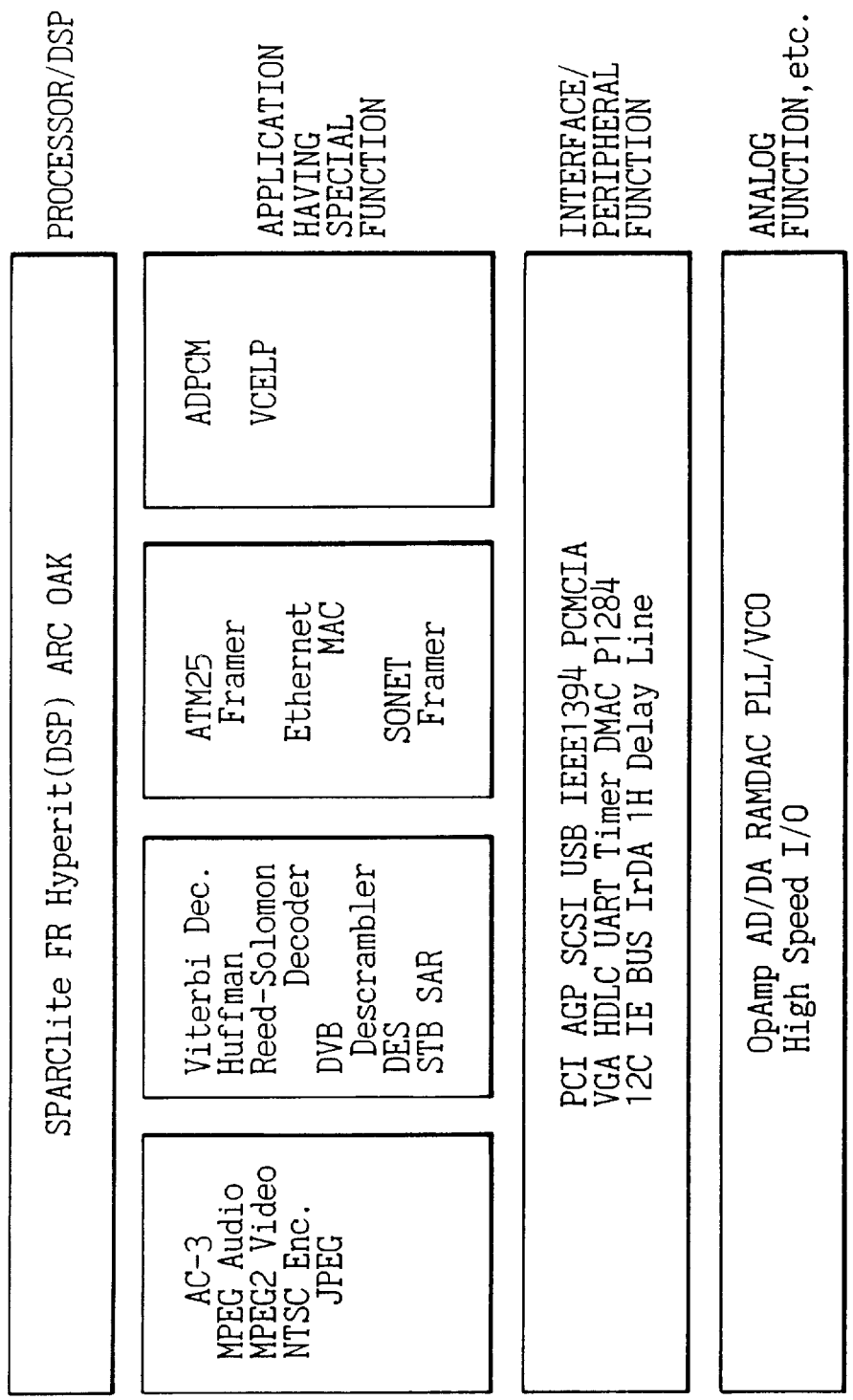
FIG. 13 is a diagram showing examples of the intellectual property.

FIG. 13 shows examples of the intellectual property.

As shown in FIG. 13, the intellectual property (IP information) includes, for example, a processor/DSP, application having special function, interface/peripheral function, and analog function, etc. As shown in FIG. 13, the IP information for the processor/DSP includes SPARClite FR, Hyperit (DSP), ARC, and OAK; and the IP information for the interface/peripheral functions includes PCI, AGP, SCSI, USB, IEEE1394, PCMCIA, VGA, HDLC, UART, and the like. Further, as shown in FIG. 13, the IP information for the application having special function includes AC-3, MPEG Audio, MPEG2 Video, NTSC Enc., JPEG; Viterbi Dec., Huffman Read-Solomon Decoder, DVB Descrambler, DES, STB SAR; ATM25 Framer, and the like; and the IP information for the analog function, etc. includes OpAmp, AD/DA, RAMDAC, and the like. Note that the above described kinds for the IP information are only examples.

Tables 1 to 4 show an example of a catalog of intellectual property. "IP" represents "intellectual property" in the following tables and descriptions.

TABLE 1

| Level | Data item | Bytes | Range | Notes (initial value, redefinition, etc.) |
|---|---|---|---|---|
| 1 | IP ID | 256 | 0 < x | |
| 1 | IP name | 256 | Optional character string | Optionally entered by user |
| 1 | Company | 256 | Managed by master | Registrant company name at registration |
| 2 | Division | 256 | Managed by master | Registrant division name at registration |
| 1 | Function | — | — | |
| 2 | Function1 | 256 | Managed by master | One selected at registration and having conversion table function |
| 3 | Function2 | 256 | Managed by master | One selected at registration and having conversion table function |

TABLE 1-continued

| Level | Data item | Bytes | Range | Notes (initial value, redefinition, etc.) |
|---|---|---|---|---|
| 4 | Function3 | 256 | Managed by master | One selected at registration and having conversion table function |
| 2 | Others | 256 | Optional character string | Described if not in categories |
| 2 | Bit | 4 | 0 < x | Unit: bit |
| 2 | Cache size | 4 | 0 < x | Unit: KB |
| 2 | Memory | — | — | |
| 3 | Bit | 4 | 0 < x | |
| 3 | Word | 4 | 0 < x | |
| 2 | Port configuration | 256 | Optional character string | |
| 2 | Function option | 256 | Optional character string | |
| 2 | Compliance standard | 256 | Optional character string | |
| 2 | Equivalent product | 256 | Optional character string | |
| 2 | FIFO size | 4 | 0 < x | |
| 2 | Channel count | 4 | 0 < x | |
| 2 | Multiplier | 8 | 0 < x | |
| 2 | Resolution | 8 | 0 < x | |
| 2 | Note | 1024 | Optional character string | |

TABLE 2

| Level | Data item | Bytes | Range | Notes |
|---|---|---|---|---|
| 1 | Market | — | — | Plurality selectable |
| 2 | Market1 | 256 | Managed by master | |
|  | Market2 | 256 | Managed by master | |
| 2 | Others | 256 | Managed by master | |
| 1 | Specification | — | — | |
| 2 | Calculation (max.) | 8 | 0 < x | Unit: MIPS, MOPS, SPECint, MFLOPS |
| 2 | Clock frequency | — | — | |
| 3 | Clock frequency (min.) | 8 | 0 < x | Unit: MHz |
| 3 | Clock frequency (typ.) | 8 | 0 < x | Unit: MHz |
| 3 | Clock frequency (max.) | 8 | 0 < x | Unit: MHz |
| 2 | Access time (min.) | 8 | 0 < x | Unit: ns |
| 2 | Transmission rate | 8 | 0 < x | Unit: Mbps, Kbps, bps, Mbyte/s |
| 2 | Frequency band | — | — | |
| 3 | Frequency band (min.) | 8 | 0 < x | Unit: KHz, MHz, GHz |
| 3 | Frequency band (max.) | 8 | 0 < x | Unit: KHz, MHz, GHz |
| 2 | Lockup time (min.) | 8 | 0 < x | Unit: ns |
| 2 | Jitter attribute (max.) | 8 | 0 < x | Unit: dB |
| 2 | S/N ratio (max.) | 8 | 0 < x | Unit: dB |
| 2 | Gain (max.) | 8 | 0 < x | |
| 2 | Power consumption | — | — | |
| 3 | Running | — | — | |
| 4 | Typ. | 8 | 0 < x | Unit: mW |
| 4 | Max. | 8 | 0 < x | Unit: mW |
| 3 | Standby | 8 | 0 < x | Unit: mW |
| 2 | Note | 1024 | Optional character string | |

TABLE 3

| Level | Data item | Bytes | Range | Notes |
|---|---|---|---|---|
| 1 | Physical specification | — | — | |
| 2 | Gate size | 4 | 0 < x | Unit: gates |
| 2 | Gate size (Note) | 32 | Optional character string | |
| 2 | Area size | 32 | Optional character string | |
| 2 | Signal pin counts | — | — | |
| 3 | Total pin | 4 | 0 < x | |
| 3 | Input pin | 4 | 0 < x | |
| 3 | Output pin | 4 | 0 < x | |
| 3 | Test pin | 4 | 0 < x | |
| 1 | Operation condition | — | — | |
| 2 | Supply voltage | 8 | x (minus value allowed) | Plurality, unit: V |
| 2 | Tj | — | — | |
| 3 | Tj (min.) | 8 | x (minus value allowed) | Unit: ° C. |
| 3 | Tj (max.) | 8 | x (minus value allowed) | Unit: ° C. |
| 2 | Signal level | — | — | |
| 3 | Signal level (min.) | 8 | x (minus value allowed) | Unit: V |
| 3 | Signal level (max.) | 8 | x (minus value allowed) | Unit: V |
| 3 | Note | 32 | Optional character string | |
| 1 | Target technology | — | — | Plurality |
| 2 | ASIC vendor name | 256 | Managed by master | |
| 3 | Technology code | 256 | Managed by master | |
| 1 | CAD tool | — | — | Plurality |
| 2 | Tool name | 256 | Managed by master | |
| 2 | Others | 256 | Optional character string | |

TABLE 4

| Level | Data item | Bytes | Range | Notes |
|---|---|---|---|---|
| 1 | Deliverable | — | — | |
| 2 | VSI compliance | 4 | 1, 0 | 1: Yes, 2: No |
| 2 | Deliverable level | 256 | Optional character string | Plurality allowed |
| 3 | Model type | 256 | Optional character string | |
| 3 | Revision | 256 | Optional character string | |
| 3 | URL | 256 | Optional character string | |
| 3 | Others | 256 | Optional character string | |
| 1 | Options | — | — | |
| 2 | System development environment | 256 | Optional character string | |
| 2 | Soft (hard, firm) | 256 | Optional character string | |
| 2 | Qualification level | 256 | Optional character string | |
| 2 | Evaluation model | 4 | 1, 0 | 1: Yes, 2: No |
| 1 | Business conditon | — | — | |
| 2 | Internal | 10 | Year | 1998/--/-- |
| 2 | Public | 10 | Year | 1998/--/-- |
| 2 | Target user | 256 | Optional character string | |
| 2 | Contract condition | 256 | Optional character string | |

TABLE 4-continued

| | | | |
|---|---|---|---|
| 1 | User support | — | — |
| 2 | Internal | — | — |
| 3 | Inquiry | 256 | Optional character string |
| 3 | Telephone | 32 | Optional character string |
| 3 | E-mail | 256 | Optional character string |
| 3 | Fax | 32 | Optional character string |
| 2 | External | — | — |
| 3 | Inquiry | 256 | Optional character string |
| 3 | Telephone | 32 | Optional character string |
| 3 | E-mail | 256 | Optional character string |
| 3 | Fax | 32 | Optional character string |

In Tables 1 to 4, an IP ID consists of four bytes, and an IP name consists of 256 bytes and is optionally entered by user. A large function category Function 1 consists of 256 bytes and is selected at registration. A bit width Bit consists of four bytes. IP IDs must follow international specifications.

Tables 5 to 7 show examples of the contents of a catalog of an MPU.

TABLE 5

| | | |
|---|---|---|
| IP ID | IP ID | 00001@ed.xxx |
| IP name | IP name | F SPARC831 |
| Company name | Company name | xxx |
| Division name | Division name | Electronics device section) LS division) system 1 |
| Application field | Large category | |
| | Small category | |
| | Other categories | |
| Function | Large category | MPU |
| | Medium category | 32 bits |
| | Small category | |
| | Other categories | |
| Memory configuration | Bit width | 32 bits |
| | Cache capacity | |
| | Bit | 4000 |
| | Word | 2000 |
| | Number of ports | |
| | Function option | BIU |
| | Standards | |
| | Equivalent | SPARC V8E core (MB86831) |
| | Number of FIFO stages | |
| | Number of channels | |
| | Multiplication number | |
| | Resolution | |
| | Others | |
| Performance | Operation performance (max.) | |
| | Operation performance (max.) unit | 66 MOPS |

TABLE 6

| | |
|---|---|
| Operation frequency | Operation frequency (min.) |
| | Operation frequency (typ.) |
| | Operation frequency (max.) 66 MHz |
| | Access time (min.) |

TABLE 6-continued

| | | |
|---|---|---|
| | Transfer rate (max.) | |
| | Transfer rate (max.) unit | |
| Frequency band | Frequency band (min.) | |
| | Frequency band (min.) unit | |
| | Frequency band (max.) | |
| | Frequency band (max.) unit | |
| | Lockup time (min.) | |
| | Jitter attribute (max.) | |
| | S/N ratio (max.) | |
| | Gain (max.) | |
| Power consumption | Power consumption (tye.) | |
| | Power consumption (max.) | |
| | Standby | |
| | Others | |
| External specifications | Gate size | |
| | Gate size (reference) | |
| | Area size | $3.6 \times 4.0$ mm$^2$ |
| Number of signal terminals | Total | |
| | Input terminals | |
| | Output terminals | |
| | Testing terminals | |
| | Others | |
| Operating conditions | Source voltage | 3.3 V |

TABLE 7

| | | |
|---|---|---|
| TJ | Tj (min.) | |
| | Tj (max.) | |
| Signal level | Signal level (min.) | |
| | Signal level (max.) | |
| | Others | |
| Corresponding technology | LSI vender name | Hard macro |
| | Technology code | CS60ALE |
| | Others | |
| CAD tool | Tool name | |
| | Others | |
| Providing information | VSI standard | |
| | Distribution level | |
| | Data type | |
| | Data version | |
| | URL | http://www.lld.ed.xxx.co.jp/macro/ |
| | Others | |
| Additional information | Development environment | |
| | Software (driver, firm) | GNU, C complier |
| | Quality level | Operation evaluation by general-purpose chip (MB86831) |
| | Evaluation sample (evaluation board) | Evaluation board for MB863x is available |
| Business conditions | In-house presentation time | Presented |
| | Outside presentation time | |
| | Target user | ASIC users of F company |
| | Contract conditions | |
| | Others | |
| User support | In-house contact address | |
| | In-house telephone | |
| | In-house e-mail address | |
| | In-house fax | |
| | Outside contact address | |
| | Outside telephone | |
| | Outside e-mail address | |
| | Outside fax | |

In Tables 5 to 7, an IP ID is "00001@ed.xxx" and an IP name is "F SPARC831." A large category of "Function" is MPU. A bit width of "Memory configuration" is 32. In this way, a catalog is prepared for each piece of intellectual property and is used for retrieval.

Tables 8 to 10 show categories (category information). The categories include a company name, a division name, an application field of the intellectual property, a function of the intellectual property, and the like. For example, the company name is F company, and the division name is one of the divisions A, B, and C.

Table 8 shows examples of the contents of categories for "Application field."

TABLE 8

| Large category | Small category |
|---|---|
| PC | Desktop |
|  | Note |
|  | NC |
|  | HPC |
|  | Others |
| PC peripheral | Keyboard |
|  | Mouse |
|  | Printer |
|  | PC board |
|  | CRT |
|  | Others |
| Mobile communication | PDC |
|  | PHS |
|  | CDMA |
|  | Others |
| ITS | Car navigation system |
|  | Others |
| Network | Others |
| Consumer | STB |
|  | DVC |
|  | DSC |
|  | Game |
|  | Others |
| File | DVD |
|  | OD |
|  | HDD |
|  | Others |

In table 8, the large category of "Application field" includes PCs (personal computers), peripheral devices, and mobile communication devices. The small category of the same includes desktop PCs, note PCs, keyboards, mice, personal digital cellular (PDC) phones, and personal handy phone systems (PHSs).

Tables 9 and 10 show examples of the contents of categories for "Function."

TABLE 9

| Large category | Medium category | Small category |
|---|---|---|
| MPU | 16 bits |  |
|  | 32 bits |  |
|  | Others |  |
| MCU | 16 bits |  |
|  | 32 bits |  |
|  | Others |  |
| DSP | 16-bit fixed point |  |
|  | 20-bit fixed point |  |
|  | 24-bit floating point |  |
|  | 32-bit floating point |  |
| Primitive macro | Data path | DCT/IDCT |
|  |  | FPU |
|  |  | ALU |
|  |  | Multiplier |
|  |  | Others |
|  | I/O macro | PGI |
|  |  | GTL |
|  |  | LVTTL |
|  |  | CTT |
|  |  | LVDS |

TABLE 9-continued

| Large category | Medium category | Small category |
|---|---|---|
|  |  | LCD driver |
|  |  | Others |

TABLE 10

| Large category | Medium category | Small category |
|---|---|---|
| Primitive macro | Mixed signal | AD/DA |
|  |  | Op. amp. |
|  |  | Comparator |
|  |  | Analog switch |
|  |  | Reference voltage |
|  |  | Others |
|  | Memory | SRAM |
|  |  | DRAM |
|  |  | Flash RAM |
|  |  | ROM |
|  |  | Others |
|  | Others | FIFO |
|  |  | PLL/VCO |
|  |  | 1H delay line |
| MPR | Interface/peripheral | PCI |
|  |  | USB |
|  |  | IEEE1394 |
|  |  | PCMCIA |
|  |  | SCSII |
|  |  | IrDA |
|  |  | Parallel port |
|  |  | UART |
|  |  | Timer |
|  |  | DMAC |
|  |  | 12CBus |
|  |  | Others |
|  | Network | Ethernet |
|  |  | ATM |
|  |  | XDSL |
|  |  | EDDI |
|  |  | Others |
|  |  | Others |

In Tables 9 and 10, the large category of "Function" includes MPUs, DSPs, and primitive macros, and the medium category of the same includes 16 bits, 32 bits, 20-bit fixed point, 32-bit floating point, I/O macros, and memories. For the I/O macros and memories in the medium category of "Function," there are small categories including PCIs, GTLs, SRAMs, and DRAMs.

According to category information such as a company name, division name, application field, and function, catalog information about intellectual property pieces is registered and processed with the use of a menu screen.

Figure 14:
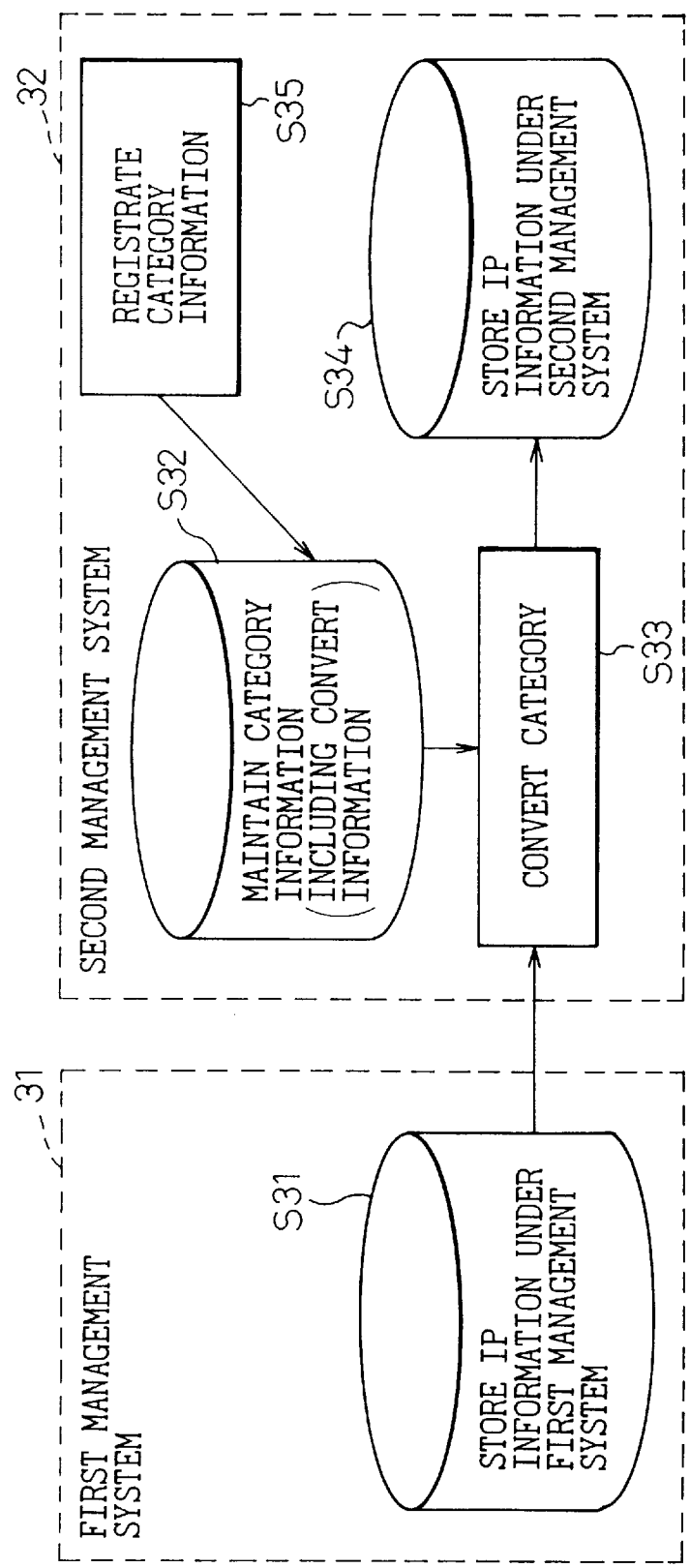
FIG. 14 is a diagram for explaining an example of a category conversion process carried out in the system of the present invention.

FIG. 14 is a diagram for explaining an example of a category conversion process carried out in the system of the present invention. In FIG. 14, reference numeral 31 denotes a management system (first management system) for F company, and 32 denotes a management system (second management system) for M company.

As shown in FIG. 14, the F company employs the first management system 31, the M company employs the second management system 32, and these management systems 31 and 32 differ from each other. Step S31 registers intellectual property under the first management system 31 of the F company. Step S33 converts the registered intellectual property according to category information maintained in step S32 into one handled by the second management system 32 of the M company. Note that step S34 registers category information in step S32 (memory portion).

Namely, the distribution system of the present invention converts the category of a given piece of intellectual property according to category information into a category that is suitable for another management environment. In general, the first management system 31 of the F company includes a plurality of servers, and category information is the same in the servers included in the first management system 31. Similarly, the second management system 32 of the M company includes a plurality of servers, and category information is the same in the servers included in the second management system 32. Nevertheless, the category information of the first management system 31 may be different from that of the second management system 32. Concretely, for example, a large category "MPU" is used in the first management system 31 and a large category "micro processor" is used in the second management system 32, when the IP information is transferred from the first management system 31 to the second management system 32, the large category "MPU" of the first management system 31 is converted to the large category "micro processor" of the second management system 32 (S33), in accordance with the category information (S32) which includes convert information from the first management system 31 to the second management system 32 and is previously registered (S35).

Figure 15:
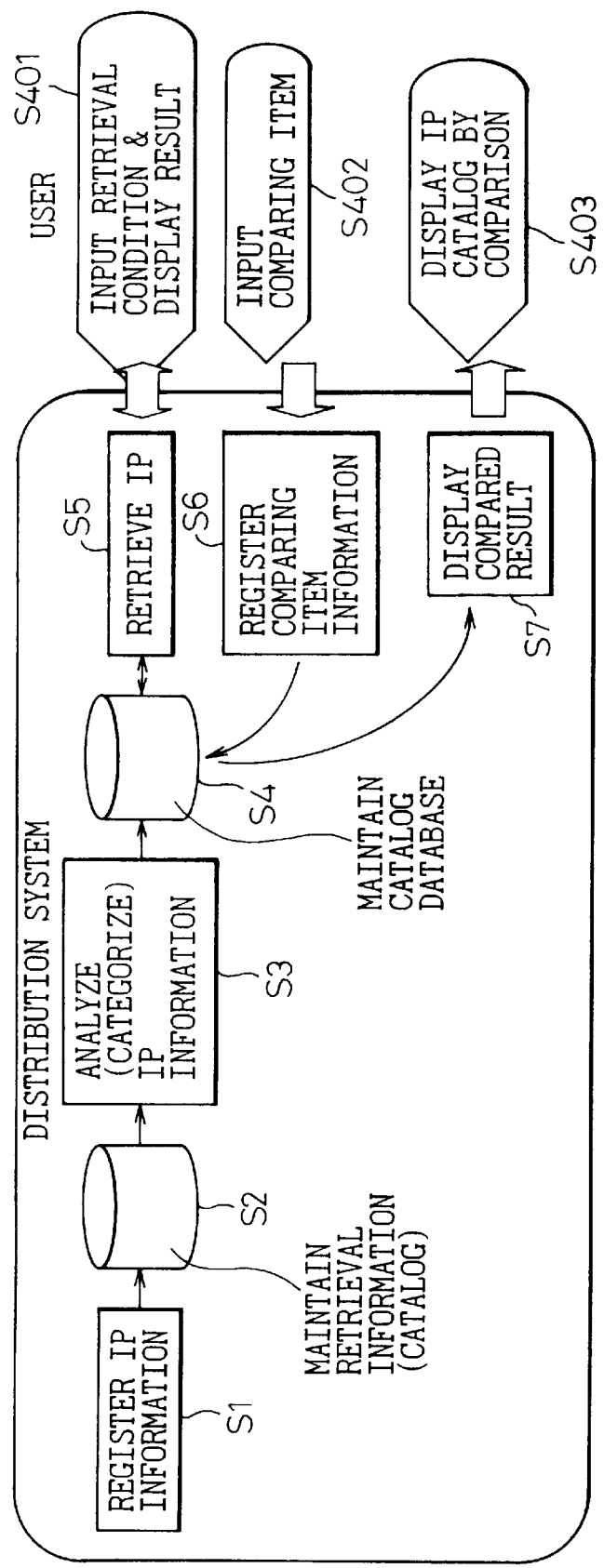
FIG. 15 is a diagram for explaining an example of a comparison displaying process carried out in the system of the present invention.

FIG. 15 is a diagram for explaining an example of a comparison displaying process carried out in the system of the present invention.

In the distribution system, step S1 registers IP information (intellectual property), and step S2 maintains retrieval information (catalog retrieval data) from the IP information. Step S3 analyzes (categorizes) the IP information in accordance with the catalog retrieval data, and step S4 maintains the catalog database. Step S5 retrieves a necessary piece of intellectual property according to a retrieval condition input by the user (S401) and displays the result for the user. Step S6 registers comparing item information according to comparing items input by the user (S402), and step S7 displays the compared results (IP catalog) with indicating to the user (S403).

FIG. 16 schematically shows an example of a display screen used when carrying out a comparison displaying process in the system of the present invention.

As shown in FIG. 16, in the display screen used when carrying out a comparison displaying process (S403 of FIG. 15), items (company name, IP name, function, transfer rate, distribution level (disclosure extent), reference, and URL) for IP information are displayed by comparing manner. In FIG. 16, three intellectual properties (NAME: AIC-xxx, MDxxx, and MBxxx) are listed (displayed) with comparing catalog values (items) thereof. Note that these items are previously registered by the user (S402 of FIG. 15). Namely, as described above with reference to FIGS. 15 and 16, the catalog is processed and stored in the memory portion (S4), and when a plurality of intellectual properties are obtained as a retrieval result, these intellectual properties are displayed by comparing items therebetween. Note that the items are determined by the user.

Figure 17:
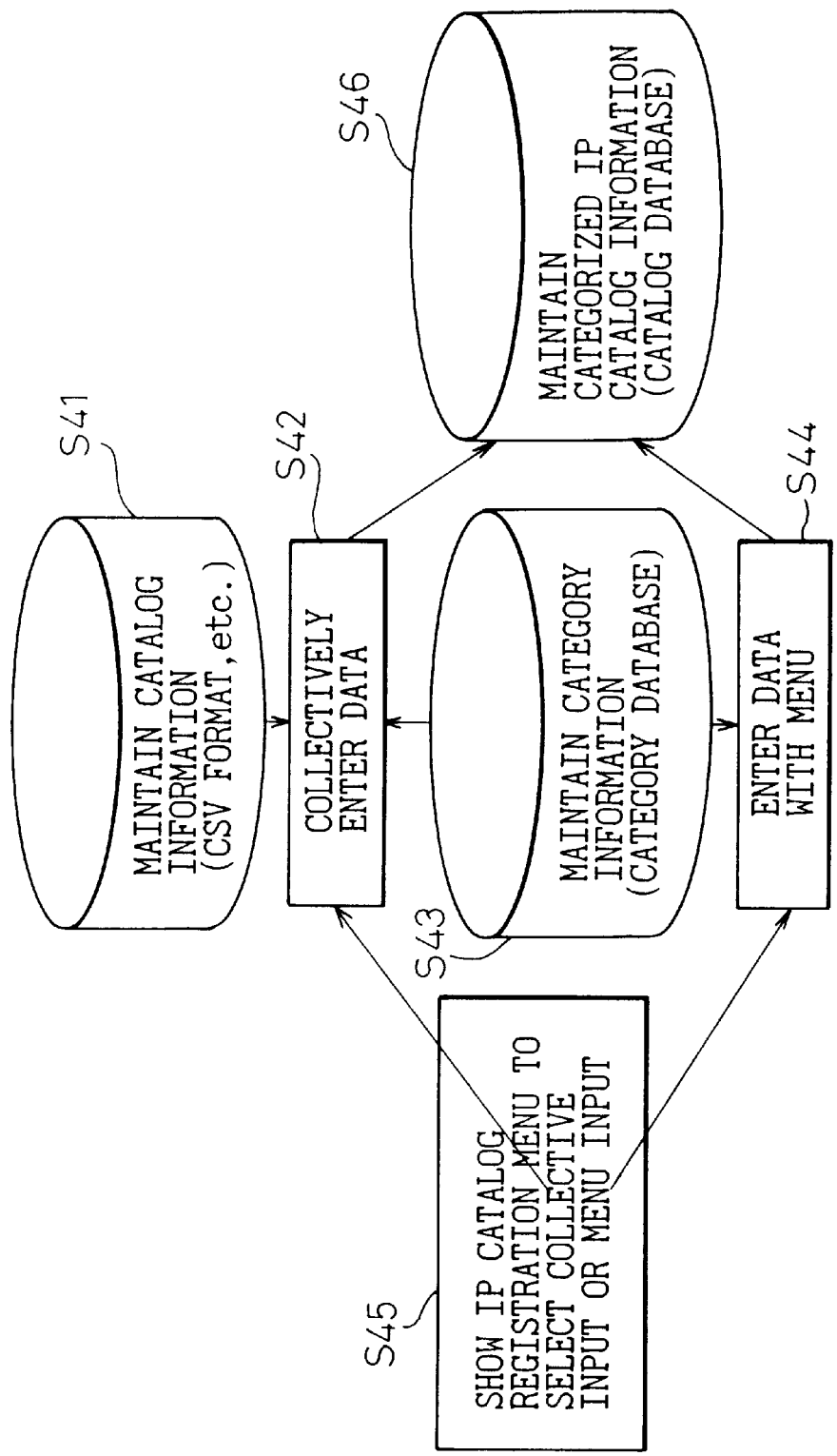
FIG. 17 is a diagram for explaining an example of a catalog information entering process carried out in the system of the present invention.

FIG. 17 shows an example of a catalog information entering process carried out in the system of the present invention.

To register catalog information such as the one shown in Tables 5 to 7 for a given piece of intellectual property, step S45 displays a catalog registration menu to let a user select a batch input operation or a menu input operation.

If the batch input operation is selected, step S42 carries out the batch input operation according to a fixed text form such as an SGML form or a CSV form prepared in step S41 and category information stored in a category database maintained in step S43. If the menu input operation is selected, step S44 carries out the menu input operation according to the category information maintained in step S43 and the menus of FIGS. 7A and 7B. Step S46 registers the input catalog information in a database according to categories. The catalog information of Tables 5 to 7 is of an intellectual property piece having the name of "F SPARC831." Various pieces of catalog information are prepared for many intellectual property pieces and are registered in the catalog database in step S46.

Figure 18:
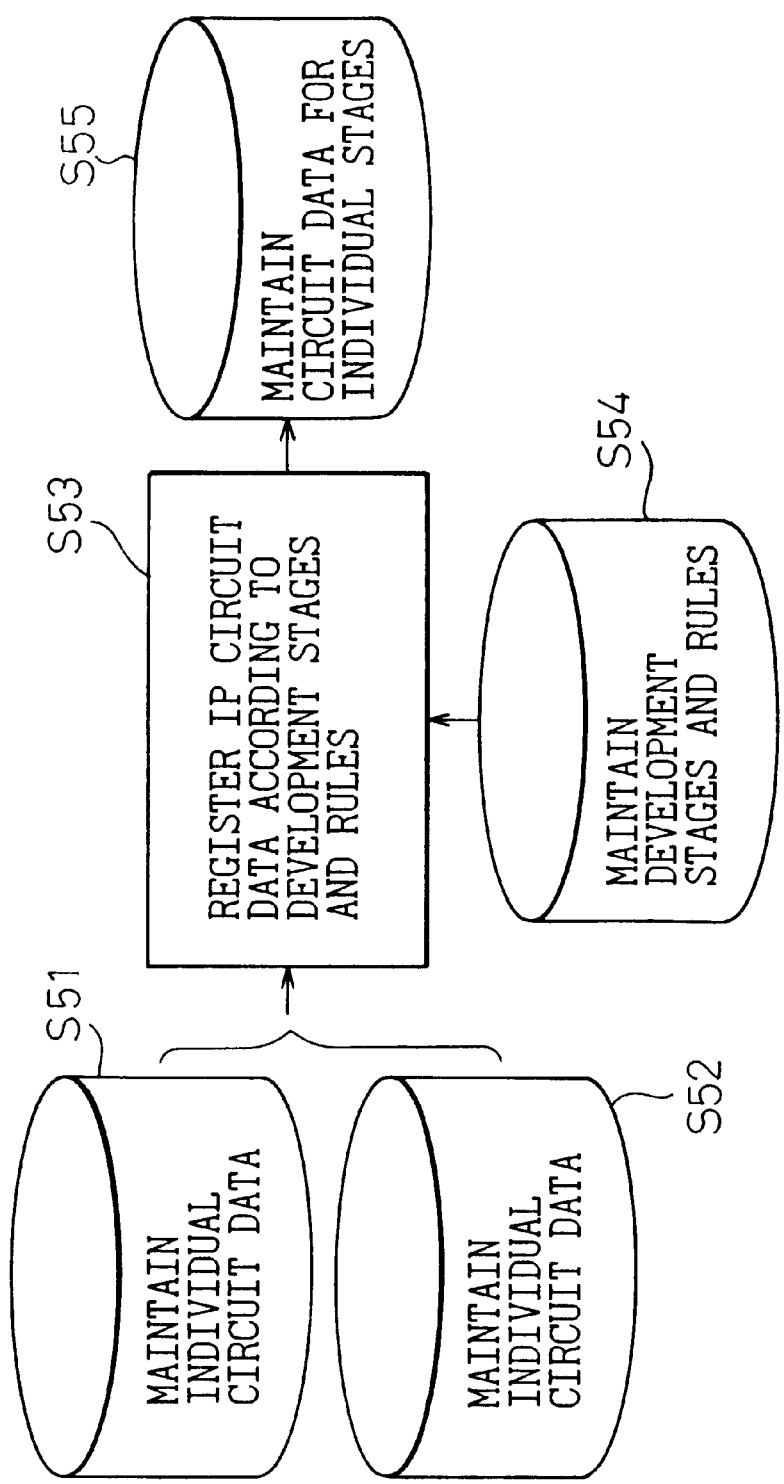
FIG. 18 is a diagram for explaining an example of intellectual property suitably provided for each development stage by the system of the present invention.

FIG. 18 shows an example of intellectual property suitably provided for each development stage by the system of the present invention.

Circuit design data required to develop a semiconductor product differs depending on development stages thereof, as shown in Table 11. Accordingly, the distribution system of the present invention holds circuit data for every development stage of semiconductor devices so that a user may retrieve necessary circuit data according to a development stage. The present invention holds registration rules for circuit data so IL that users may register circuit data according to the rules without mistakes.

Table 11 shows relationships between data types and distribution levels (development stages), and Table 12 shows data types and corresponding expression forms and contents.

TABLE 11

| Data type | Distribution level (Development stage) | | | | | |
|---|---|---|---|---|---|---|
| | Spec. | High | Logical | | Physical | |
| | Archi-tecture | Be-havior | RTL + script | Net list | Lay-out | Mask |
| Design data | | | | | | |
| Document | ○ | ○ | ○ | ○ | ○ | ○ |
| C/C++ | ○ | Δ | Δ | Δ | Δ | Δ |
| Behavior | | ○ | Δ | Δ | Δ | Δ |
| RTL | | | ○ | Δ | Δ | Δ |
| Synthetic script | | | ○ | Δ | Δ | Δ |
| Net list | | | | ○ | ○ | Δ |
| Simulation data | ○ | ○ | ○ | ○ | ○ | ○ |
| Test data | | | ○ | ○ | ○ | ○ |
| Floor plan data | | | | | ○ | Δ |
| Layout data | | | | | ○ | Δ |
| Timing data | | | | Δ | ○ | ○ |
| R/C data | | | | | ○ | Δ |
| Mask data | | | | | Δ | ○ |

○: Necessary
Δ: Desirable

TABLE 12

| Data type | Expression | Contents |
|---|---|---|
| Catalog | Text | Characteristics (writer name, IP form, etc.) |
| Contents | HTML (text, graphics, and tables) | Functional outline, directions for use, and uses |
| Document | HTML or text depending on word processor software | Detailed specifications |

TABLE 12-continued

| Data type | Expression | Contents |
|---|---|---|
| C/C++ | C, C++ | |
| Behavior | VHDL | |
| RTL | VHDL, Verilog-HDL | |
| Synthetic script | Depending on tools | |
| Net list | VHDL, Verilog-HDL, EDIF | |
| Simulation data | VHDL, Verilog-HDL, C, C++ | Function check data |
| Test data | FTDL, VHDL, Verilog-HDL | |
| Floor plan data | PDEF | |
| Layout plan | DEF | Layout and wiring data |
| Timing data | SDF | Delay and setup hold |
| R/C data | SPF, SPICE | Capacitance and resistance |
| Mask data | GDS II | |

In Table 11, design data (circuit data) includes documents, net lists, layout data, and mask data that are dependent on development stages. In Table 12, documents are expressed in HTML and text to describe detailed specifications. The layout data relates to the layout and wiring of elements.

Developing a system LSI involves, for example, a study stage, specification-level design stage, high-level design stage, logical-level design stage, and physical-level design stage. The study stage needs the catalog and contents of intellectual property such as functions, qualities, and providers. The specification-level design stage needs documents about architecture evaluation (specification simulation) and detailed specifications in C/C++. The high-level design stage needs documents, behavior, and simulation data for system verification (operation simulation and operation synthesis). The logical-level design stage needs net lists and test data for logical verification (RTL simulation, logical synthesis, test synthesis, chip design planning, gate level simulation, and timing analysis). The physical-level design stage needs documents, net lists, simulation data, test data, floor plan data, layout data, timing data, R/C data, and mask data for packaging/chip variation (layout, automatic timing adjustment, and test pattern automatic generation).

According to the present invention, these pieces of data are included in intellectual property so that a user may selectively acquire data necessary for each development stage.

Figure 19:
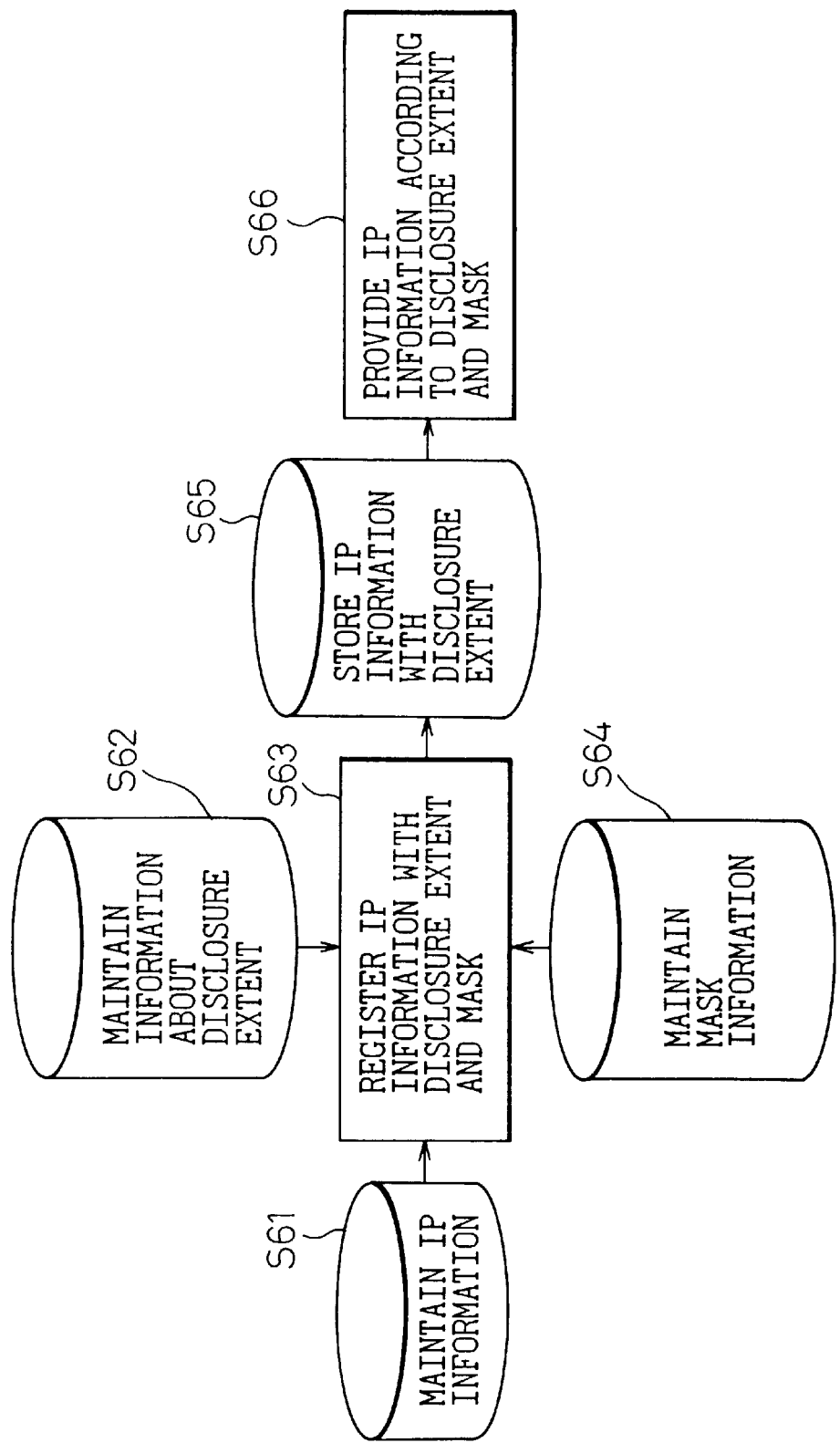
FIG. 19 is a diagram for explaining an example of a process of setting a disclosure extent and a mask in the system of the present invention.

FIG. 19 shows an example of a process of setting disclosure extent and mask in the system of the present invention.

A piece of intellectual property may be for a project controlled by the server 231 (FIG. 3), the division controlled by the server 210, the company controlled by the server 200, the specific customer controlled by the server 234, or a customer controlled by the server 101. Depending on these servers and customers, each piece of intellectual property has a different distribution extent.

In FIG. 19, step S62 registers disclosure extent information for each user group. Step S64 registers disclosure mask information to specify masked items for each intellectual property piece. Step S61 registers a piece of intellectual property, and step S63 attaches a disclosure extent and mask to the intellectual property piece according to the disclosure extent information registered in step S62 and the mask information registered in step S64. Step S65 maintains the intellectual property having the disclosure extent and mask.

Step S66 provides a user with the intellectual property according to the disclosure extent and mask and a group to which the user belongs. For example, a disclosure extent registered in the server 230 (FIG. 3) of the division C controls the extent of disclosure of hierarchically lower servers such as the server 231.

Figure 20:
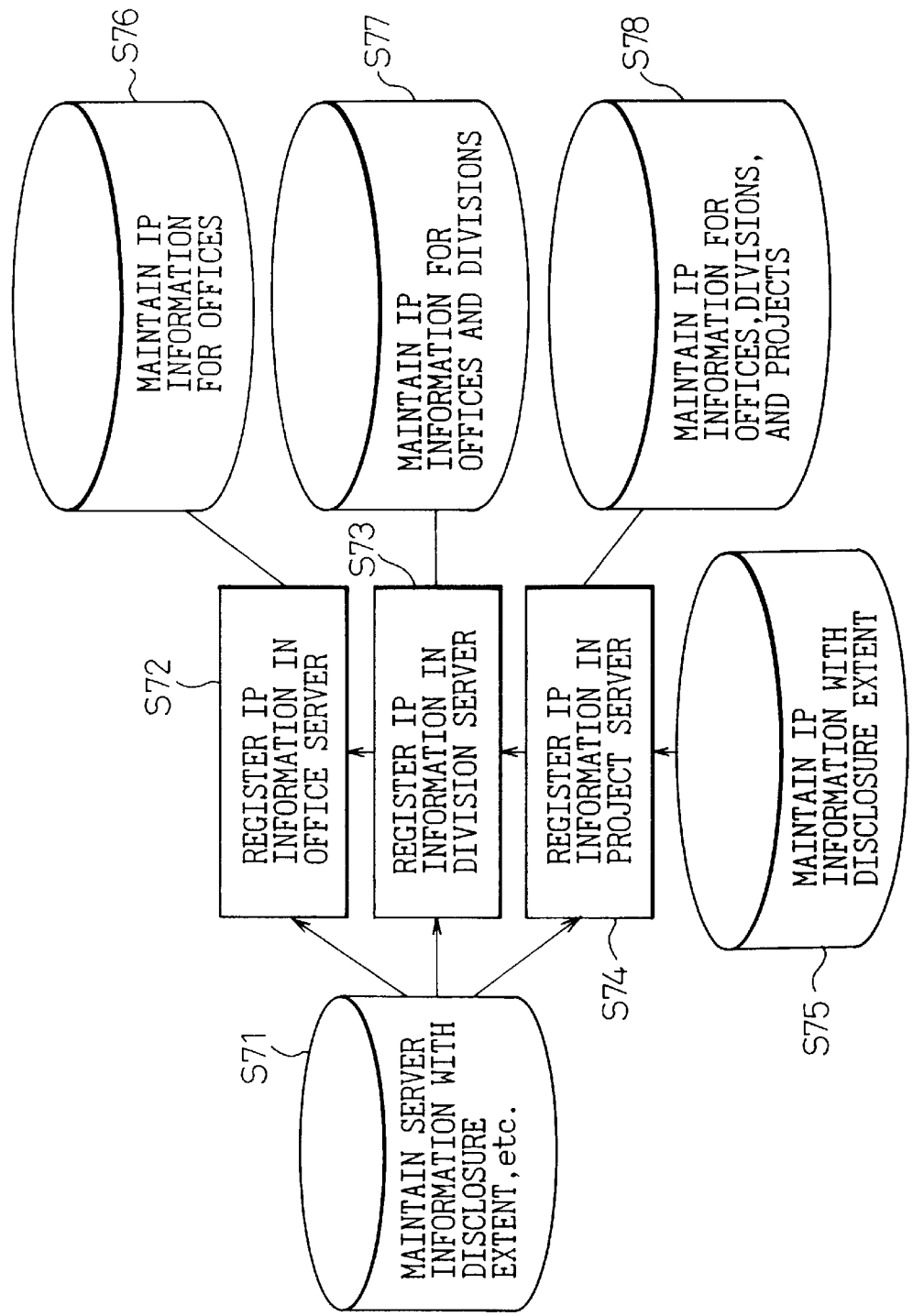
FIG. 20 is a diagram for explaining an example of server information handled by the system of the present invention.

FIG. 20 shows an example of server information handled by the system of the present invention.

The distribution system of FIG. 3 hierarchically arranges servers. To secure the safety and processing efficiency of intellectual property pieces, the present invention hierarchically controls the intellectual property pieces among the hierarchical servers. The present invention registers, in the servers, each piece of intellectual property with the hierarchical position and disclosure extent thereof. According to the registered hierarchical positions and disclosure extents, the intellectual property pieces are transferred among and accumulated in the servers.

Step S71 maintains server information including disclosure extents, step S75 maintains intellectual property with disclosure extents, step S76 maintains intellectual property for offices, step S77 maintains intellectual property for offices and divisions, and step S78 maintains intellectual property for offices, divisions, and projects. Step S72 registers in office servers (such as 200 of FIG. 3) the information and intellectual property from steps S71, S75, and S76. Step S73 registers in division servers (such as 210 of FIG. 3) the information and intellectual property from steps S71, S75, and S77. Step S74 registers in project servers (such as 231 of FIG. 3) the information and intellectual property from steps S71, S75, and S78.

Figure 21:
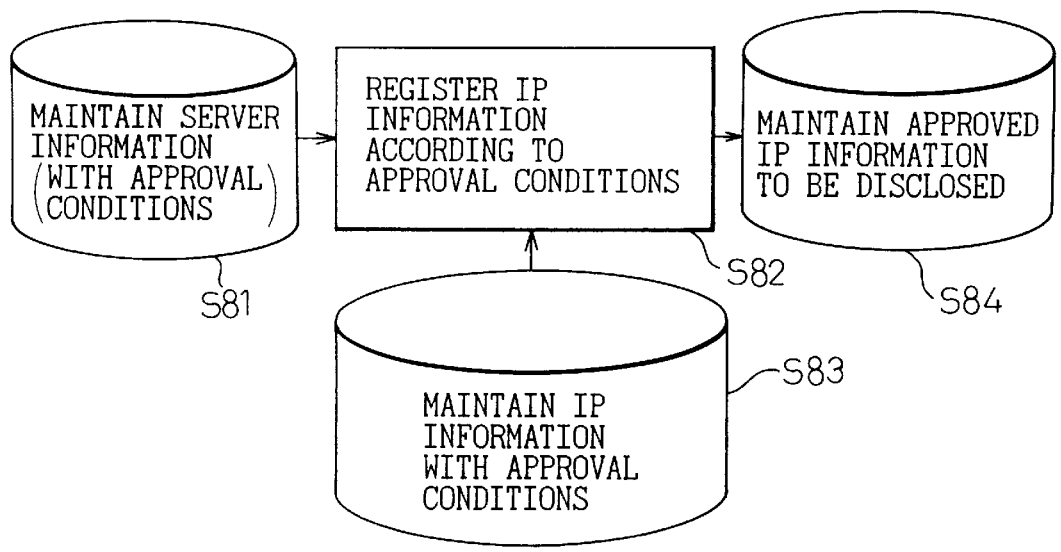
FIG. 21 is a diagram for explaining an example of an approval process carried out in the system of the present invention.

FIG. 21 shows an example of an approval process carried out in the system of the present invention.

Intellectual property is important for companies, and therefore, disclosure thereof needs approval. The distribution system of the present invention sets approval conditions when registering server information in servers and carries out an approval process when registering intellectual property in the servers. In FIG. 21, step S81 maintains server information with approval conditions, and step S83 maintains intellectual property with approval conditions. Step S82 registers intellectual property and checks to see if the intellectual property is approved for disclosure, and step S84 maintains approved intellectual property. Any piece of intellectual property is allowed to be transferred to approved servers, and any server is allowed to disclose approved intellectual property.

A right to use service through the distribution system of the present invention is controlled according to a user ID and password. The distribution system involves various types of rights such as an intellectual property retrieval/reference right, intellectual property registration/update/deletion right, intellectual property record lookup right, intellectual property registration approval right, and intellectual property registration user ID issuance right. Information used to control a user includes the user name, e-mail address, telephone number, division name, company name, user ID, password, user group name, user ID registration date, user ID expiration date, disclosure approval user ID, type of the right, mail service conditions, etc., of the user.

Figure 22:
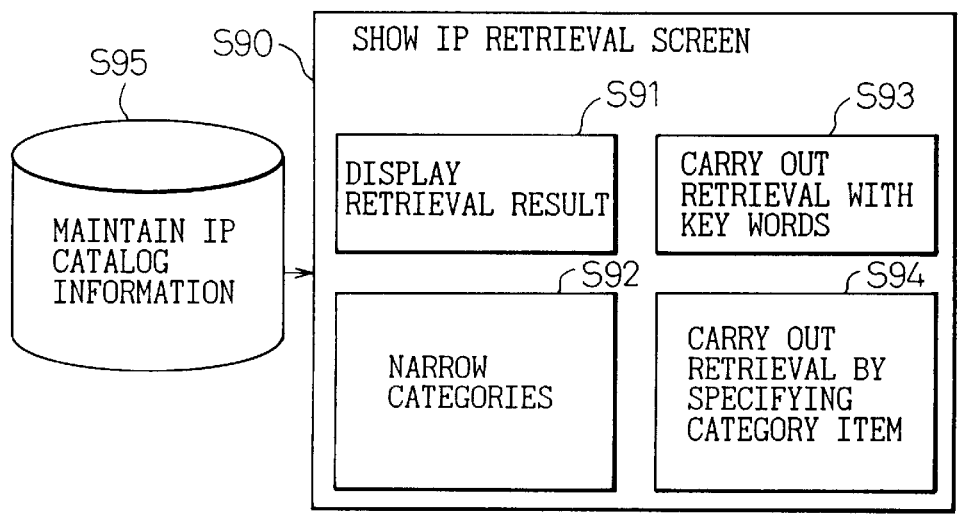
FIG. 22 is a diagram for explaining an example of a retrieval process carried out in the system of the present invention.

FIG. 22 shows an example of a retrieval process carried out in the system of the present invention.

It is important for the distribution system to let users easily retrieve necessary pieces of intellectual property. Step S95 maintains intellectual property catalogs. Step S90 displays an intellectual property retrieval screen. Step S92 narrows categories of registered intellectual property. Step S93 carries out a retrieval operation with key words (free words), and step S94 carries out a retrieval operation by specifying category items.

Step S91 displays a retrieval result. Examples of screens displayed in steps S90 and S91 are shown in FIGS. 8A to 8C. Examples of key words used in step S93 are company names such as F company and M company, or the general names of circuits and semiconductor products such as MPU. Step S93 must accept various key words. For example, not only formal company names but also abbreviated company names must be accepted. Further, a variety of names of microprocessors and CPUs must be accepted as key words so that users may retrieve necessary information with these words. An example of narrowing categories is shown in Tables 9 and 10. To narrow items in "Function" in Tables 9 and 10, the large category including MPU, MCU, MPR, etc., medium category including 16 bits, 32 bits, etc., and small category including FPU, ALU, etc., are used.

Figure 23:
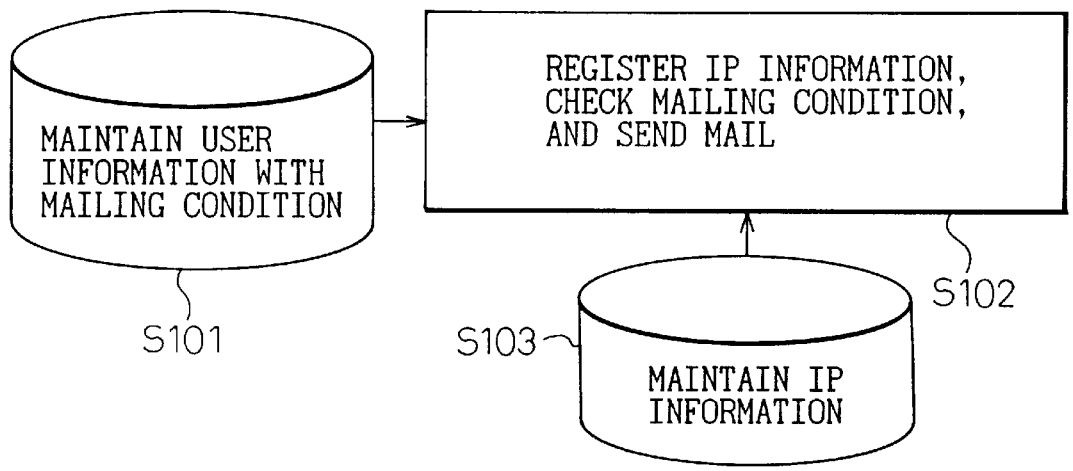
FIG. 23 is a diagram for explaining an example of a mailing process carried out in the system of the present invention.

FIG. 23 shows an example of a mailing process carried out in the system of the present invention.

Users want to receive latest intellectual property in time. Step S101 registers a mailing condition for each user so that mail is sent to the user whenever a registration of new intellectual property is made in the distribution system. When step S103 registers new intellectual property, step S102 automatically informs users of the new registration of intellectual property by mail according to the user information set in step S101.

Figure 24:
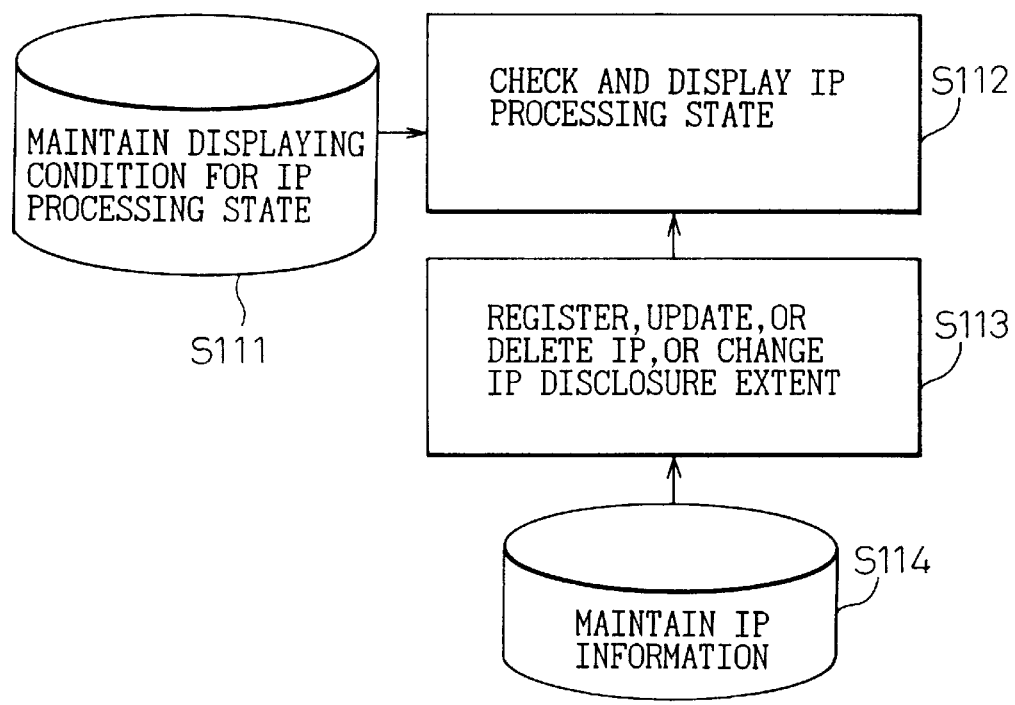
FIG. 24 is a diagram for explaining an example of a displaying process carried out in the system of the present invention.

FIG. 24 shows an example of a displaying process carried out in the system of the present invention.

Users want to easily grasp the processing states of intellectual property. Step S111 registers conditions for displaying registration, update, and deletion processes to be carried out on intellectual property. Step S114 maintains intellectual property, and step S113 carries out registration, update, deletion, and disclosure extent change processes on the intellectual property. Step S112 checks the processing situations of step S113 and displays the situations according to the display conditions set in step S111 so that users may grasp the processing situations.

Figure 25:
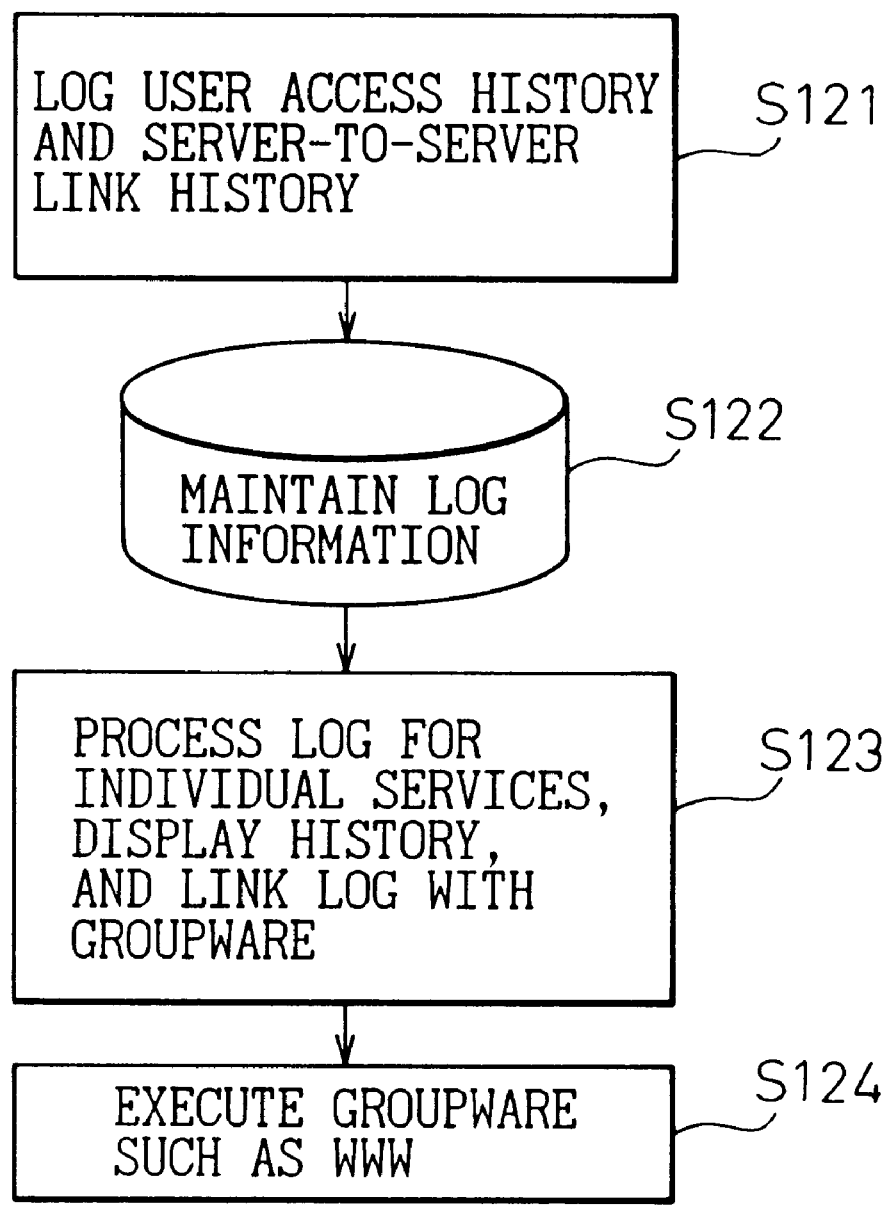
FIG. 25 is a diagram for explaining an example of a logging process carried out in the system of the present invention.

FIG. 25 shows an example of a logging process carried out in the system of the present invention.

Users want to grasp and analyze how intellectual property is used. Step S121 automatically logs and accumulates user access history and server-to-server link history, and step S122 collects the logs. Step S123 classifies the logs according to services, displays the history, and links the logs with groupware such as the worldwide web. Step S124 makes the logs public through the groupware.

Figure 26:
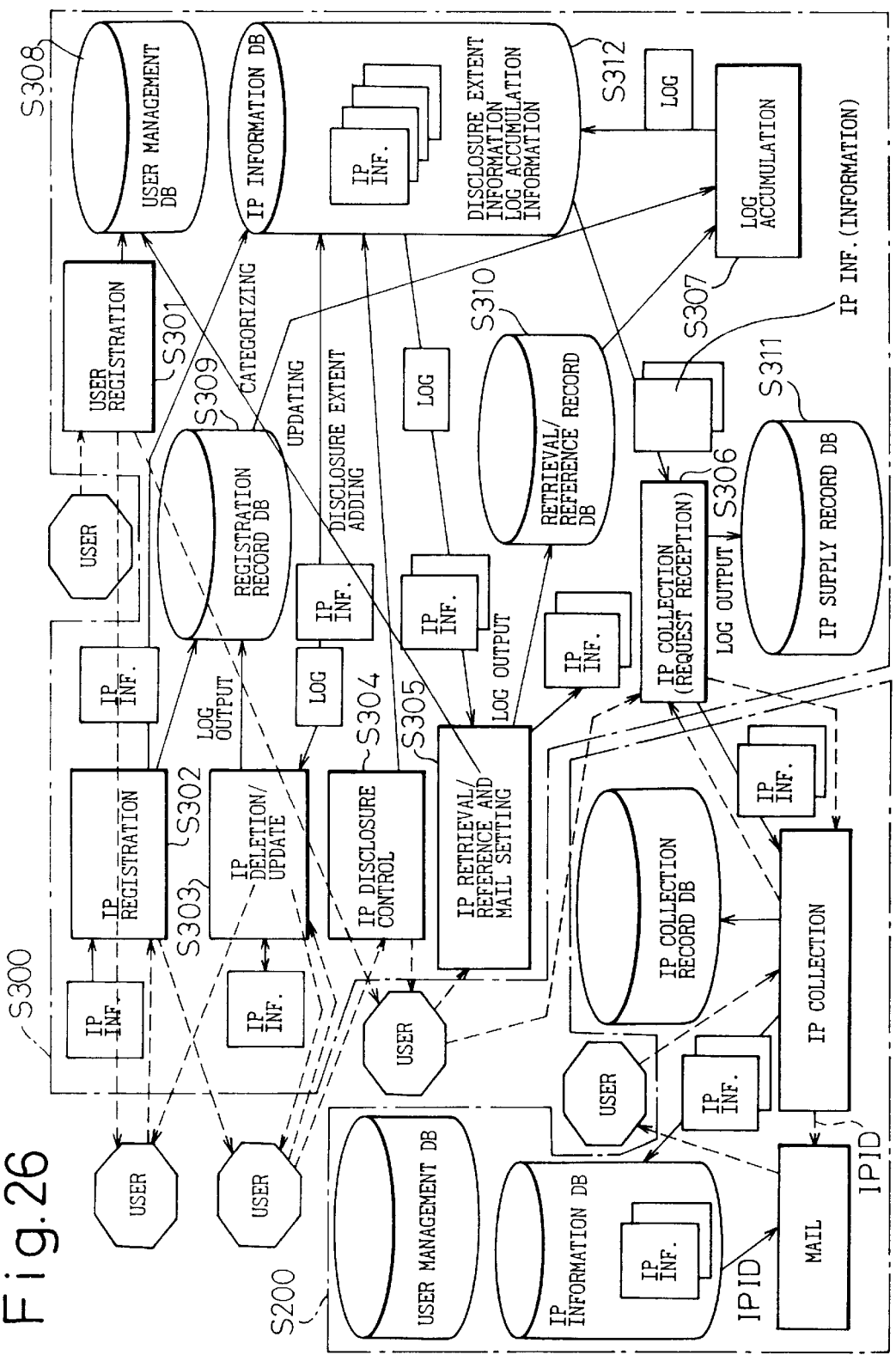
FIG. 26 is a diagram dynamically showing various processes carried out in the system of the present invention.

FIG. 26 dynamically shows various processes carried out in the system of the present invention. A first server S200 of FIG. 26 corresponds to, for example, the server 210 of FIG. 3, and a second server S300 of FIG. 26 to the server 220 of FIG. 3.

The server S300 carries out user registration step S301, intellectual property registration step S302, intellectual property deletion/update step S303, intellectual property disclosure control step S304, intellectual property retrieval/reference and mail setting step S305, intellectual property collection step S306, and logging step S307. The server S300 has a storage unit such as a hard disk drive to store a user management database maintained in step S308, a registration record database maintained in step S309, a retrieval/reference record database maintained in step S310, an intellectual property service record database maintained in step S311, and an intellectual property database maintained in step S312.

Figure 27:
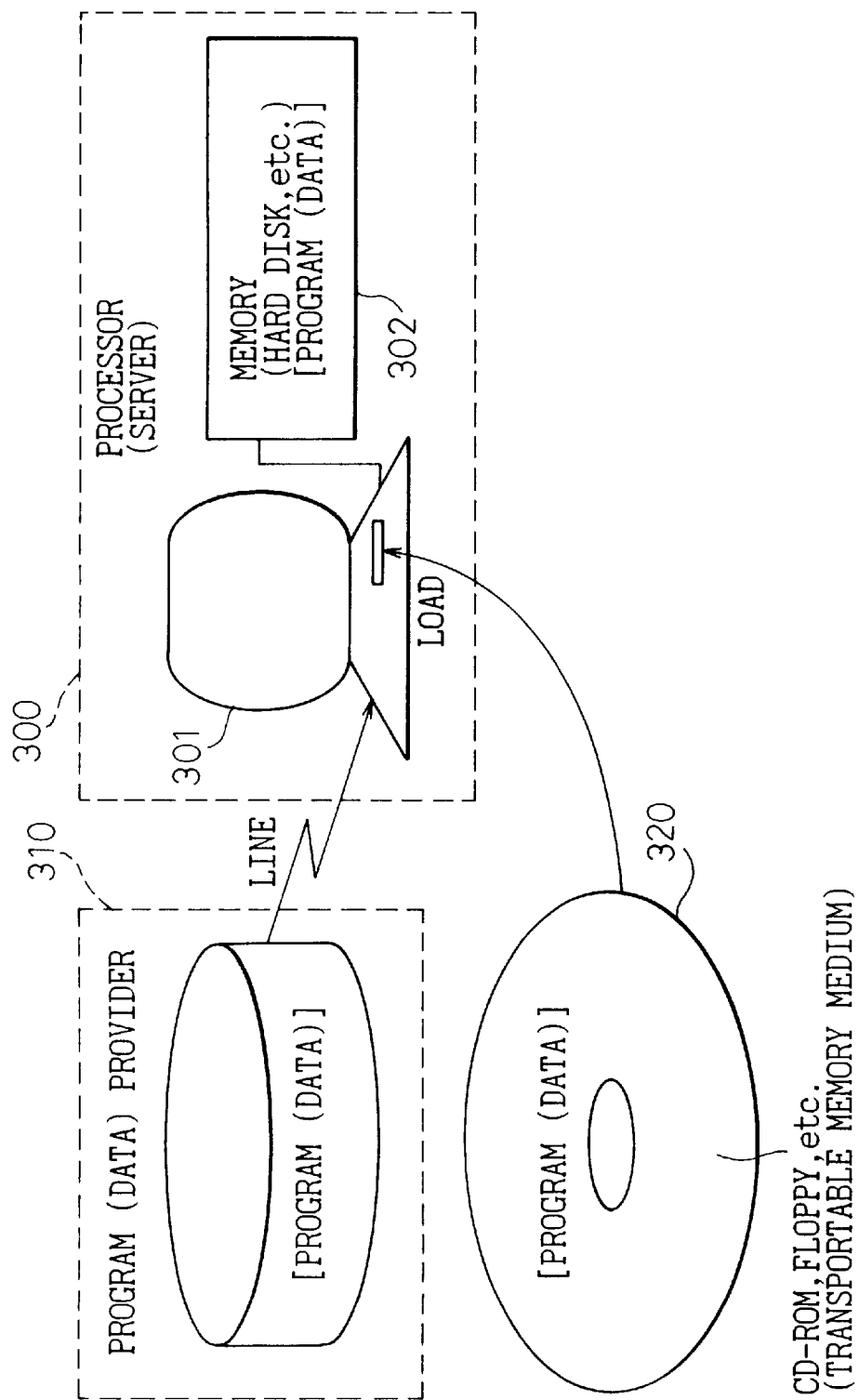
FIG. 27 is a diagram schematically showing a server and a storage medium installed in the system of the present invention.

FIG. 27 shows a server and a storage medium for the system of the present invention. The server 300 may be any one of the servers shown in FIG. 3.

A program for controlling the server 300 according to the present invention is installed in a memory 302 of the server 300. The memory 302 maybe a RAM, a hard disk drive, etc. The program is provided by a supplier 310 to the server 300 through a line or a portable memory 320 such as a CD-ROM on a floppy disk.

As explained above, the distribution system of the present invention distributes intellectual property through the Internet or intranet so that users may receive latest intellectual property at low cost and on time.

The present invention prepares technical information to promote the reuse of intellectual property and the developing efficiency of system LSIs. The present invention enables users to easily get intellectual property such as circuit data through networks. With the present invention, any user may obtain intellectual property that is most suitable for a design stage in which the user is involved.

In this way, the present invention provides users with intellectual property, in particular, semiconductor design property on time and lets the users optimally share the intellectual property.

Many different embodiments of the present invention may be constructed without departing from the spirit and scope of the present invention and it should be understood that the present invention is not limited to the specific embodiments described in this specification, except as defined in the appended claims.

What is claimed is:

1. A distribution apparatus for distributing intellectual property to be reused for semiconductor product designing, comprising:
   a memory portion for registering intellectual property comprising circuit data to be reused for designing a semiconductor product with a catalog used when retrieving the intellectual property, users, and services available for the users;
   a processing portion, connected to the memory portion, for providing a user with a service allowed for the user; and
   a communication portion, connected to the processing portion, for automatically distributing the intellectual property.

2. A distribution apparatus as claimed in claim 1, wherein the memory portion registers control information about the services, retrieval information about the intellectual property, and extraction information about the intellectual property.

3. A distribution apparatus as claimed in claim 1, wherein the intellectual property includes a catalog used when retrieving the intellectual property, contents effectively representing the intellectual property, and circuit data to be reused for designing a semiconductor product; and the registered intellectual property is processed according to the services so that the users can use the intellectual property.

4. A distribution apparatus as claimed in claim 3, wherein the catalog is processed and stored in the memory portion, and when a plurality of intellectual properties are obtained as a retrieval result, these intellectual properties are displayed by comparing items therebetween.

5. A distribution apparatus as claimed in claim 4, wherein the items are determined by the user.

6. A distribution apparatus as claimed in claim 3, wherein the catalog is registered collectively or through a menu according to category information, and the intellectual property is processed according to the category information.

7. A distribution apparatus as claimed in claim 3, wherein the circuit data is prepared for each development stage of semiconductor products so that a proper piece of circuit data is reused for a given development stage.

8. A distribution apparatus as claimed in claim 3, wherein the circuit data is registered according to registration rules that are set in advance.

9. A distribution apparatus as claimed in claim 3, wherein the users are divided into groups that are related to disclosure extents; and each piece of intellectual property is registered with a disclosure extent for each information item of catalog information so that each piece of the intellectual property is disclosed to the users according to the disclosure extent.

10. A distribution apparatus as claimed in claim 9, wherein a catalog of a given piece of intellectual property is registered with a mask that defines a disclosure extent of the catalog.

11. A distribution apparatus as claimed in claim 3, wherein a retrieval operation on the catalog is carried out by narrowing hierarchical categories related to the catalog and by specifying key words and at least one category item.

12. A distribution apparatus as claimed in claim 1, wherein the memory portion registers category information for intellectual property so that the intellectual property is distributed among different environments according to the category information.

13. A distribution apparatus as claimed in claim 1, wherein a mailing state is registered on a specific occasion for each user to indicate whether or not information about the registration of intellectual property must be sent to the user; and mail is sent to the user according to the mailing state at a specific occasion.

14. A distribution apparatus as claimed in claim 13, wherein the specific occasion is the time of registering, updating and deleting the intellectual property, and the time of changing disclosure extents.

15. A distribution apparatus as claimed in claim 1, wherein each piece of intellectual property is registered with a display condition on a specific occasion so that the intellectual property is processed and displayed according to the display condition.

16. A distribution apparatus as claimed in claim 15, wherein the specific occasion is the time of registering, updating and deleting the intellectual property, and the time of changing disclosure extents.

17. A distribution apparatus as claimed in claim 1, wherein a log of users who accessed the intellectual property is collected; and the log is processed and displayed according to users and is automatically linked with groupware so that the processed log is provided to the users.

18. A distribution apparatus for distributing intellectual property to be reused for semiconductor product designing, comprising:
 a registration means for registering intellectual property comprising circuit data to be reused for designing a semiconductor product with a catalog used when retrieving the intellectual property, users, and services available for the users;
 an execution means for providing a user with a service allowed for the user; and
 a distribution means for automatically distributing the intellectual property.

19. A distribution system having at least one server for distributing intellectual property to be reused for semiconductor product designing, wherein the server comprises:
 a memory portion for registering intellectual property comprising circuit data to be reused for designing a semiconductor product with a catalog used when retrieving the intellectual property, users, and services available for the users;
 a processing portion, connected to the memory portion, for providing a user with a service allowed for the user; and
 a communication portion, connected to the processing portion, for automatically distributing the intellectual property.

20. A distribution system as claimed in claim 19, wherein the distribution system comprises a plurality of servers that are hierarchically managed; and information about the servers is registered with hierarchical information and disclosure extents so that intellectual property is transferred among the servers according to the hierarchical information and disclosure extents.

21. A distribution system as claimed in claim 20, wherein the information about the servers is registered with disclosure approval conditions so that a given server discloses only approved intellectual property pieces.

22. A distribution system as claimed in claim 20, wherein the servers are connected to one another through networks.

23. A distribution system as claimed in claim 22, wherein the networks comprise the internet or an intranet.

24. A distribution system as claimed in claim 19, wherein the memory portion registers control information about the services, retrieval information about the intellectual property, and extraction information about the intellectual property.

25. A distribution system as claimed in claim 19, wherein the intellectual property includes a catalog used when retrieving the intellectual property, contents effectively representing the intellectual property, and circuit data to be reused for designing a semiconductor product; and the registered intellectual property is processed according to the services so that the users use the intellectual property.

26. A distribution system as claimed in claim 25, wherein the catalog is processed and stored in the memory portion, and when a plurality of intellectual properties are obtained as a retrieval result, these intellectual properties are displayed by comparing items therebetween.

27. A distribution system as claimed in claim 26, wherein the items are determined by the user.

28. A distribution system as claimed in claim 25, wherein the catalog is registered collectively or through a menu according to category information, and the intellectual property is processed according to the category information.

29. A distribution system as claimed in claim 25, wherein the circuit data is prepared for each development stage of semiconductor products so that a proper piece of circuit data is reused for a given development stage.

30. A distribution system as claimed in claim 25, wherein the circuit data is registered according to registration rules that are set in advance.

31. A distribution system as claimed in claim 25, wherein the users are divided into groups that are related to disclosure extents; and each piece of intellectual property is registered with a disclosure extent so that each piece of the intellectual property is disclosed to the users according to the disclosure extent.

32. A distribution system as claimed in claim 31, wherein a catalog of a given piece of intellectual property is registered with a mask that defines a disclosure extent of the catalog.

33. A distribution system as claimed in claim 25, wherein a retrieval operation on the catalog is carried out by narrowing hierarchical categories related to the catalog and by specifying key words and at least one category item.

34. A distribution system as claimed in claim 19, wherein the memory portion registers category information for intellectual property so that the intellectual property is distributed among different environments according to the category information.

35. A distribution system as claimed in claim 19, wherein a mailing state is registered at a specific occasion for each user to indicate whether or not information about the registration of intellectual property must be sent to the user; and mail is sent to the user according to the mailing state at a specific occasion.

36. A distribution system as claimed in claim 35, wherein the specific occasion is the time of registering, updating and deleting the intellectual property, and the time of changing disclosure extents.

37. A distribution system as claimed in claim 19, wherein each piece of intellectual property is registered with a display condition at a specific occasion so that the intellectual property is processed and displayed according to the display condition.

38. A distribution system as claimed in claim 37, wherein the specific occasion is the time of registering, updating and deleting the intellectual property, and the time of changing disclosure extents.

39. A distribution system as claimed in claim 19, wherein a log of users who accessed the intellectual property is collected; and the log is processed and displayed according to users and is automatically linked with groupware so that the processed log is provided to the users.

40. A distribution method of distributing intellectual property to be reused for semiconductor product designing, comprising:

registering intellectual property comprising circuit data to be reused for designing a semiconductor product with a catalog used when retrieving the intellectual property, users, and services available for the users;

providing a user with a service allowed for the user; and automatically distributing the intellectual property.

41. A program storage device readable by a machine, tangibly embodying a program of instructions executable by the machine to perform a distribution method of distributing intellectual property to be reused for semiconductor product designing, the method comprising the steps of:

registering intellectual property comprising circuit data to be reused for designing a semiconductor product with a catalog used when retrieving the intellectual property, users, and services available for the users;

providing a user with a service allowed for the user; and automatically distributing the intellectual property.

42. A distribution apparatus for distributing intellectual property to be reused for semiconductor product designing, comprising:

a memory portion for registering intellectual property comprising circuit data to be reused for designing a semiconductor product with a content used when retrieving the intellectual property, users, and services available for the users;

a processing portion, connected to the memory portion, for providing a user with a service allowed for the user; and a communication portion, connected to the processing portion, for automatically distributing the intellectual property.

43. A distribution apparatus for distributing intellectual property to be reused for semiconductor product designing, comprising:

a registration means for registering intellectual property comprising circuit data to be reused for designing a semiconductor product with a content used when retrieving the intellectual property, users, and services available for the users;

an execution means for providing a user with a service allowed for the user; and a distribution means for automatically distributing the intellectual property.

44. A distribution system having at least one server for distributing intellectual property to be reused for semiconductor product designing, wherein the server comprises:

a memory portion for registering intellectual property comprising circuit data to be reused for designing a semiconductor product with a content used when retrieving the intellectual property, users, and services available for the users;

a processing portion, connected to the memory portion, for providing a user with a service allowed for the user; and a communication portion, connected to the processing portion, for automatically distributing the intellectual property.

45. A distribution method of distributing intellectual property to be reused for semiconductor product designing, comprising:

registering intellectual property comprising circuit data to be reused for designing a semiconductor product with a content used when retrieving the intellectual property, users, and services available for the users;

providing a user with a service allowed for the user; and automatically distributing the intellectual property.

46. A program storage device readable by a machine, tangibly embodying a program of instructions executable by the machine to perform a distribution method of distributing intellectual property to be reused for semiconductor product designing, the method comprising:

registering intellectual property comprising circuit data to be reused for designing a semiconductor product with a content used when retrieving the intellectual property, users, and services available for the users;

providing a user with a service allowed for the user; and automatically distributing the intellectual property.

* * * * *